US009938384B2

(12) United States Patent
Takeoka et al.

(10) Patent No.: US 9,938,384 B2
(45) Date of Patent: Apr. 10, 2018

(54) ULTRA-THIN POLYMER FILM, AND POROUS ULTRA-THIN POLYMER FILM

(71) Applicants: NANOTHETA CO, LTD., Tokyo (JP); Shinji Takeoka, Tokyo (JP); TORAY INDUSTRIES, INC., Tokyo (JP)

(72) Inventors: Shinji Takeoka, Tokyo (JP); Akihiro Saito, Tokyo (JP); Hong Zhang, Tokyo (JP); Natsuki Takamizawa, Tokyo (JP)

(73) Assignees: Nanotheta Co, Ltd. (JP); Shinji Takeoka (JP); Toray Industries, Inc. (JP)

(*) Notice: Subject to any disclaimer, the term of this patent is extended or adjusted under 35 U.S.C. 154(b) by 537 days.

(21) Appl. No.: 14/383,191

(22) PCT Filed: Mar. 12, 2013

(86) PCT No.: PCT/JP2013/056823
§ 371 (c)(1),
(2) Date: Sep. 5, 2014

(87) PCT Pub. No.: WO2013/137260
PCT Pub. Date: Sep. 19, 2013

(65) Prior Publication Data
US 2015/0056399 A1 Feb. 26, 2015

(30) Foreign Application Priority Data
Mar. 12, 2012 (JP) .................................. 2012-054255

(51) Int. Cl.
*C08J 5/18* (2006.01)
*B29C 41/12* (2006.01)
(Continued)

(52) U.S. Cl.
CPC .............. *C08J 5/18* (2013.01); *B01D 67/003* (2013.01); *B01D 67/009* (2013.01); *B01D 69/02* (2013.01);
(Continued)

(58) Field of Classification Search
CPC ... C08J 5/18; B82Y 5/00; B82Y 15/00; B82Y 30/00; B82Y 40/00
See application file for complete search history.

(56) References Cited

U.S. PATENT DOCUMENTS 3,695,989 A    10/1972   Albert
3,933,561 A    1/1976   Larson et al.
(Continued)

FOREIGN PATENT DOCUMENTS

DE    29901072 U1   1/1999
DE    10058258 A1   8/2002
(Continued)

OTHER PUBLICATIONS

Kuwata-Gonokami et al. "Polymer Microdisk and Microring Lasers" Optics Letters, 1995, vol. 20, p. 2093-2095.*
(Continued)

Primary Examiner — Gerard Higgins
(74) Attorney, Agent, or Firm — DLA Piper LLP (US)

(57) ABSTRACT

The objective of the present invention is to provide a porous ultra-thin polymer film, and a method for producing said porous ultra-thin polymer film. The present invention provides a porous ultra-thin polymer film with a film thickness of 10 nm-1000 nm. In addition, the present invention provides a method for producing a porous ultra-thin polymer film, comprising the steps of: dissolving two types of mutually-immiscible polymers in a first solvent in an arbitrary proportion to obtain a solution; applying the solution onto a substrate and then removing the first solvent from the
(Continued)

solution applied onto the substrate to obtain a phase-separated ultra-thin polymer film that has been phase-separated into a sea-island structure; and immersing the ultra-thin polymer film in a second solvent which is a good solvent for the polymer of the island parts but a poor solvent for a polymer other than the island parts to remove the island parts, thereby obtaining a porous ultra-thin polymer film.

4 Claims, 12 Drawing Sheets

(51) Int. Cl.
    *B29C 67/20* (2006.01)
    *B01D 67/00* (2006.01)
    *B01D 69/14* (2006.01)
    *B01D 69/02* (2006.01)
    *B82Y 40/00* (2011.01)

(52) U.S. Cl.
    CPC ............ *B01D 69/141* (2013.01); *B29C 41/12* (2013.01); *B29C 67/202* (2013.01); *B01D 2323/18* (2013.01); *B01D 2325/02* (2013.01); *B01D 2325/04* (2013.01); *B01D 2325/06* (2013.01); *B82Y 40/00* (2013.01); *C08J 2201/04* (2013.01); *C08J 2201/0542* (2013.01); *C08J 2205/044* (2013.01); *C08J 2333/12* (2013.01); *C08J 2367/04* (2013.01); *C08J 2425/06* (2013.01); *Y10T 428/21* (2015.01); *Y10T 428/249979* (2015.04)

(56) References Cited

U.S. PATENT DOCUMENTS

| | | | |
|---|---|---|---|
| 6,365,173 | B1 * | 4/2002 | Domb ............... A61K 9/1647 424/422 |
| 2002/0065330 | A1 | 5/2002 | Klotzer |
| 2002/0091169 | A1 | 7/2002 | Klotzer |
| 2002/0154260 | A1 | 10/2002 | Uchida et al. |
| 2003/0186405 | A1 | 10/2003 | Lee et al. |
| 2006/0016685 | A1 | 1/2006 | Hawkins et al. |
| 2009/0136756 | A1 | 5/2009 | Yabu et al. |
| 2009/0239381 | A1 | 9/2009 | Nishimi et al. |
| 2009/0291270 | A1 | 11/2009 | Zettl et al. |
| 2010/0038830 | A1 | 2/2010 | Lahann et al. |
| 2010/0062258 | A1 | 3/2010 | Takeoka et al. |
| 2010/0115672 | A1 | 5/2010 | Mirkin et al. |
| 2010/0155325 | A1 | 6/2010 | Zhang et al. |
| 2011/0052821 | A1 | 3/2011 | Ishizuka et al. |
| 2011/0171137 | A1 * | 7/2011 | Patolsky ............... B82Y 15/00 424/9.3 |
| 2011/0247523 | A1 | 10/2011 | Hatakeyama et al. |
| 2012/0034466 | A1 | 2/2012 | Takeoka et al. |
| 2012/0057239 | A1 | 3/2012 | Shiojiri |

FOREIGN PATENT DOCUMENTS

| | | |
|---|---|---|
| EP | 0081182 A2 | 6/1983 |
| EP | 0889080 A1 | 1/1999 |
| EP | 1647570 A1 | 4/2006 |
| EP | 2017055 A1 | 1/2009 |
| EP | 2168669 A1 | 3/2010 |
| EP | 2366449 A2 | 9/2011 |
| JP | S61186576 A | 8/1986 |
| JP | S61231227 A | 10/1986 |
| JP | 2002221608 A | 8/2002 |
| JP | 2003155365 A | 5/2003 |
| JP | 2004502554 A | 1/2004 |
| JP | 2004124088 A | 4/2004 |
| JP | 2005082746 A | 3/2005 |
| JP | 2006070254 A | 3/2006 |
| JP | 2006321852 A | 11/2006 |
| JP | 2007260817 A | 10/2007 |
| JP | 2007279372 A | 10/2007 |
| JP | 2008036491 A | 2/2008 |
| JP | 2008149235 A | 7/2008 |
| JP | 2008254146 A | 10/2008 |
| JP | 2009256592 A | 11/2009 |
| JP | 2010116463 A | 5/2010 |
| JP | 2010138286 A | 6/2010 |
| JP | 2010254815 A | 11/2010 |
| JP | 2010-65151 A | 3/2011 |
| JP | 2011-45838 A | 3/2011 |
| JP | 2011105780 A | 6/2011 |
| JP | 2011186056 A | 9/2011 |
| JP | 2011236412 A | 11/2011 |
| WO | 9720885 A1 | 6/1997 |
| WO | 0170873 A2 | 9/2001 |
| WO | 02089955 A1 | 11/2002 |
| WO | 2004050222 A1 | 6/2004 |
| WO | 2006025592 A1 | 3/2006 |
| WO | 2008050913 A1 | 5/2008 |
| WO | 2009029859 A2 | 3/2009 |

OTHER PUBLICATIONS

Özalp et al. "Vancomycin release from poly(D,L-lactide) and poly(lactide-co-glycolide) disks", J. Microencapsulation, 2002, vol. 19, p. 83-94.*

Avgoustakis, Konstantinos, "Polylactic-co-Glycolic Acid (PLGA)", 2005, p. 1-11, acquired from http://www.pharmacy.upatras.gr/index.php/el/latest-news/doc_download/2415-paper-in-ebbe-encyclopedia.*

Zimnitsky, et al., Perforated, Freely Suspended Layer-by-Layer Nanoscale Membranes, American Chemical Society, (2008, 24. pp. 5996-6006.

Extended European Search Report dated Mar. 8, 2016, issued in counterpart PCT Application No. PCT/JP2013056823.

Supplementary Search Report dated Jun. 24, 2016, issued in counterpart Singapore Application No. 11201405484O.

Hu, Y. et al., A blown film process to disk-shaped polymer ellipsoids. Advanced Materials, Oct. 6, 2008, vol. 20, No. 23, pp. 4599-4602.

Kim, J-K et al., Langmuir (2008) vol. 24, No. 16, p. 8898-8903.

Wu, K-H et al., Langmuir (2006) vol. 22, No. 19, p. 8029-8035.

Karim, A. et al., Physical Review E (1998) vol. 57, No. 6, p. R6273-6276.

Winesett, D.A. et al., Polymer International (2000) vol. 49, No. 5, p. 458-462.

Xue, L. et al., Progress in Polymer Science (2011) vol. 37, No. 4, p. 564-594.

Search Report and Written Opinion from the Intellectual Property Office of Singapore on Oct. 2, 2015 for corresponding Singapore patent application No. 11201405484U.

Japanese language International search report dated Jul. 2, 2013 and its English language translation issued in corresponding PCT application PCT/JP2013/056823.

Singapore Supplementary Search Report dated Apr. 27, 2016 issued in corresponding Singapore patent application No. 11201405484U.

Search Report dated Jul. 11, 2017 by the Intellectual Property Office of Singapore (IPOS) in corresponding Singapore Patent Application No. 10201610281S.

Kyoritsu Shuppan, Inc./Masao Nanjo, Chemicals large encyclopedia 8, Japan, Sep. 15, 1972, miniature edition 14th printing, 743rd page, polyethylene glycols.

Japanese Office Action dated Sep. 12, 2017 in corresponding Japan Patent Application No. 2014-504931 with its computer-generated English translation obtained from JPO (Dossier Access System).

* cited by examiner (a)

(b)

(c)

(d)

(e)

(f)

ULTRA-THIN POLYMER FILM, AND POROUS ULTRA-THIN POLYMER FILM

CROSS REFERENCE TO RELATED APPLICATIONS

This application is a 371 of international application number PCT/JP2013/056823, filed on Mar. 12, 2013, and claims the benefit of priority under 35 USC 119 of Japanese patent application number 2012-054255, filed on Mar. 12, 2012, which are incorporated herein by reference.

TECHNICAL FIELD the present invention relates to an ultra-thin polymer film, a free-standing porous ultra-thin polymer film and else.

BACKGROUND ART

Ultra-thin films of organic molecules are conventionally prepared by a spin-coating technique, an electrolytic polymerization technique, a vapor deposition technique, a vapor deposition polymerization technique or the like. In addition, Langmuir-Blodgett (LB) method is well known as a method for obtaining an alignment layer. According to this method: amphiphilic molecules are dissolved in a volatile organic solvent and deposited at a gas-liquid interface; the solvent is evaporated to be compressed; and the resultant monomolecular layer is transferred onto a solid substrate. This method allows the control of the number of the thin film layers and the order of the laminated layers. Also known are a method in which polymerizable functional groups are introduced into amphiphilic molecules to form an ultra-thin film by LB method which is then polymerized for stabilization, and a method in which an ultra-thin film is obtained by LB method from already polymerized high-molecular-weight amphiphilic molecules or amphiphilic block copolymers.

Moreover, for a free-standing ultra-thin polymer film having an arbitrary shape, for example, a method in which a self-assembled monomolecular layer is formed on a gold substrate that has a pattern acquired by microlithography technique, then polymerizable molecules are adsorbed and polymerized in water and the formed ultra-thin polymer film is peeled off from the gold substrate, and a method in which polymer electrolytes are alternatively laminated on a substrate to form an ultra-thin polymer film and then the ultra-thin film is peeled off from the substrate by using an aqueous support membrane to prepare an ultra-thin film having the same size as the substrate are known (see, for example, Patent Document 1: WO 2006/025592, Patent Document 2: WO2008/050913, etc.).

Meanwhile, a composite membrane made of a plurality of polymers or block copolymers is known to have a micro-phase-separated structure which includes spherical, columnar, lamellar and gyroidal structures. For example, a method in which a micro-phase-separated columnar structure formed with an amphiphilic block copolymer is utilized so as to decompose and eliminate the polymer forming the columns by means of plasma, light, an electron beam, heat, an acid, a base, a reductant or the like, thereby obtaining a porous film is known (see, for example, Patent Document 3: Japanese Unexamined Patent Application Publication No. 2003-155365, Patent Document 4: Japanese Unexamined Patent Application Publication (Translation of PCT) No. 2004-502554, Patent Document 5: Japanese Unexamined Patent Application Publication No. 2004-124088, Patent Document 6: Japanese Unexamined Patent Application Publication No. 2010-116463, etc.).

When an amphiphilic polymer solution is applied onto a glass substrate or the like and humid air is sent upon preparing a cast film, latent heat is released upon evaporation by which the moisture builds up condensation, leaving homogeneous array of droplets on the solution. According to a known method, these self-assembled droplets serve as templates to give clearly opened pores with a constant size of few microns in a polymer film, thereby forming a thin polymer film having a honeycomb structure (see, for example, Patent Document 7: Japanese Unexamined Patent Application Publication No. 2006-70254, etc.).

Since porous films that utilize such an above-described micro-phase-separated structure use polymers having a particular kind of structure such as block copolymers or amphiphilic polymers, they lacked versatility. Furthermore, use of a general polymer for obtaining a porous ultra-thin polymer film having a plurality of pores in a free-standing ultra-thin organic polymer film has been unknown. In addition, a method for producing such a porous ultra-thin polymer film has also been unknown.

Here, claim 1 of Patent Document 8 states a method for producing a porous film, comprising the steps of: applying an application liquid containing an organic compound and a hydrophobic organic solvent onto a support to form a coating layer; and condensing water vapor on the coating layer to dry the coating layer (i.e., condensing and drying steps).

In addition, claims 1 of Patent Documents 9 and 10 state a porous film comprising a micro-phase-separated structure including a continuous phase having a water-insoluble polymer A as the primary component and a cylindrical microdomain having a water-soluble polymer B as the primary component, wherein cylindrical micropores with an average pore diameter of 1-1000 nm are present in the cylindrical microdomain.

Moreover, Example 2 of Patent Document 11 describes that a substance resulting from PMMA deterioration is removed from an asymmetric diblock/copolymer film made of polystyrene (PS) and polymethyl methacrylate (PMMA) formed on a gold film to prepare a PS nanopore template.

PRIOR ART DOCUMENTS

Patent Documents

[Patent Document 1] WO2006/025592
[Patent Document 2] WO2008/050913
[Patent Document 3] Japanese Unexamined Patent Application Publication No. 2003-155365
[Patent Document 4] Japanese Unexamined Patent Application Publication (Translation of PCT) No. 2004-502554
[Patent Document 5] Japanese Unexamined Patent Application Publication No. 2004-124088
[Patent Document 6] Japanese Unexamined Patent Application Publication No. 2010-116463
[Patent Document 7] Japanese Unexamined Patent Application Publication No. 2006-70254
[Patent Document 8] Japanese Unexamined Patent Application Publication No. 2011-105780
[Patent Document 9] Japanese Unexamined Patent Application Publication No. 2010-138286
[Patent Document 10] Japanese Unexamined Patent Application Publication No. 2009-256592

[Patent Document 11] Japanese Unexamined Patent Application Publication No. 2004-502554

SUMMARY OF THE INVENTION

Problem to be Solved by the Invention

The present invention has an objective of providing a free-standing porous ultra-thin polymer film, a method for producing a porous ultra-thin polymer film and the like.

Means for Solving the Problem

In order to solve the above-described problem, the present inventors have gone through intensive studies and in consequence conceived that a porous polymer can be produced by mixing a polymer solution with a poor solvent which is compatible with the solvent for the polymer solution and whose boiling point is higher than that of said solvent for the polymer solution, casting the resultant on a substrate to obtain an ultra-thin polymer film that has been phase-separated into a sea-island structure, and further evaporating the poor solvent making up the island parts, and that alternatively a porous ultra-thin polymer film can be produced by dissolving two types of polymers that are mutually immiscible in solid states in a common solvent, casting the resultant on a substrate to obtain an ultra-thin polymer film that has been phase-separated into a sea-island structure and treating it with a good solvent for the polymer making up the island parts so that only the island parts are removed from the ultra-thin polymer film, thereby accomplishing the present invention.

Specifically, the present invention provides the following free-standing porous ultra-thin polymer film and a method for producing the same.

[1] A free-standing porous ultra-thin polymer film having a film thickness of 10 nm-1000 nm.

[2] The porous ultra-thin polymer film according to [1] above, wherein the pores with a size of 30 nm-50 μm are present on the surface at a density of $5\times10^{-3}$ pores/μm$^2$-50 pores/μm$^2$.

[2a] The porous ultra-thin polymer film according to [1] above, wherein the size of the pores is in a range that is larger than 1 μm and smaller or equal to 25 μm.

[2b] The porous ultra-thin polymer film according to [2a] above, wherein the size of the pores is in a range that is smaller or equal to 15 μm.

[3] The porous ultra-thin polymer film according to either one of [1] or [2] above, wherein the pore diameter distribution is at least ±20%.

[3a] The porous ultra-thin polymer film according to either one of [2a] or [2b] above, wherein the pore diameter distribution is at least ±20%.

[4] The porous ultra-thin polymer film according to any one of [1], [2] and [3] above, wherein the ratio of the pore diameter to the film thickness of the porous ultra-thin polymer film (pore diameter (μm)/film thickness (μm)) is 0.1-50.

[4a] The porous ultra-thin polymer film according to any one of [2a], [2b] and [3a] above, wherein the ratio of the pore diameter to the film thickness of the porous ultra-thin polymer film (pore diameter (μm)/film thickness (μm)) is 0.1-50.

[5] The porous ultra-thin polymer film according to any one of [1], [2], [3] and [4] above, wherein the polymer is at least one selected from the group consisting of polyhydroxyalkanoic acid, a copolymer of polyhydroxyalkanoic acid, poly(ester-ether), a polyester of aliphatic dicarboxylic acid and aliphatic diol, polyamide, polyurethane, polysaccharide ester, poly(acrylate), poly(methacrylate), polystyrene, polyvinyl acetate and polysiloxane.

[5a] The porous ultra-thin polymer film according to any one of [2a], [2b], [3a] and [4a] above, wherein the polymer is at least one selected from the group consisting of polyhydroxyalkanoic acid, a copolymer of polyhydroxyalkanoic acid, poly(ester-ether), a polyester of aliphatic dicarboxylic acid and aliphatic diol, polyamide, polyurethane, polysaccharide ester, poly(acrylate), poly(methacrylate), polystyrene, polyvinyl acetate and polysiloxane.

[6] A method for producing a porous ultra-thin polymer film, comprising the steps of:

dissolving two types of mutually-immiscible polymers in a first solvent in an arbitrary proportion to obtain a solution;

applying the resulting solution onto a substrate and then removing the first solvent from the solution applied onto the substrate to obtain an ultra-thin polymer film that has been phase-separated into a sea-island structure; and immersing the ultra-thin polymer film in a second solvent which is a good solvent for the polymer of the island parts but a poor solvent for the polymer other than the island parts to remove the island parts, thereby obtaining a free-standing porous ultra-thin polymer film with a film thickness of 10 nm-1000 nm.

[6-2] The method according to [6] above, wherein the island parts of the sea-island structure have a size in a range that is larger than 1 μm and smaller or equal to 25 μm, and are present on the surface at a density of $5\times10^{-3}$ pores/nm$^2$-50 pores/gm$^2$.

[6-3] The method according to [6-2] above, wherein the size of the island parts of the sea-island structure is in a range that is smaller or equal to 15 μm.

[6-4] The method according to any one of [6], [6-2] and [6-3] above, wherein the film thickness of the ultra-thin polymer film is 10 nm-1000 nm.

[6-5] The method according to any one of [6], [6-2], [6-3] and [6-4] above, wherein the combination of the first polymer forming the island parts of the sea-island structure and the second polymer forming the sea parts is selected from the following group:

(i) first polymer: polystyrene, and second polymer: polymethyl methacrylate;

(ii) first polymer: polystyrene, and second polymer: poly-D/L-lactic acid;

(iii) first polymer: polymethyl methacrylate, and second polymer: polystyrene;

(iv) first polymer: polyethylene glycol, and second polymer: polystyrene;

(v) first polymer: polyvinylpyrrolidone, and second polymer: polystyrene; and (vi) first polymer: poly-D/L-lactic acid, and second polymer: polystyrene.

[7] A method for producing a porous ultra-thin polymer film comprising the steps of:

dissolving a polymer as a raw material in a mixed solvent containing arbitrary proportions of a good solvent for said polymer and a poor solvent whose boiling point is higher than that of said good solvent to obtain a solution; and applying the resulting solution onto a substrate and removing the mixed solvent from the solution applied onto the substrate to obtain a free-standing porous ultra-thin polymer film having a film thickness of 10 nm-1000 nm.

[8] A method for producing a free-standing porous ultra-thin polymer film having a film thickness of 10 nm-1000 nm, the method comprising the steps of:

dissolving a polymer in a solvent to obtain a solution;

applying the solution onto a textured substrate and then removing the solvent from the solution applied onto the substrate to obtain an ultra-thin polymer film;

removing the textured substrate by dissolving it with a solvent that does not dissolve the ultra-thin polymer film.

[9] The method according to [8] above, wherein the textured substrate is a substrate having a polymer thin film having dispersed and fixed microparticles, and wherein the solvent is removed from the solution applied onto the substrate to obtain an ultra-thin polymer film and then the substrate having the polymer thin film with the dispersed and fixed microparticles is removed by dissolving it in a solvent that does not dissolve the ultra-thin polymer film to obtain a porous ultra-thin polymer film.

[10] The method according to [9] above, wherein the microparticles are at least one type of particles selected from the group consisting of polystyrene particles, silica particles, dextran particles, polylactic acid particles, polyurethane microparticles, polyacrylic particles, polyethyleneimine particles, albumin particles, agarose particles, iron oxide particles, titanium oxide microparticles, alumina microparticles, talc microparticles, kaolin microparticles, montmorillonite microparticles and hydroxyapatite microparticles.

[11] The method according to either one of [9] and [10] above wherein the microparticles have a diameter of 20 nm-3000 nm.

[12] A method for producing a porous ultra-thin polymer film comprising the steps of:

dissolving a polymer in a solvent to obtain a solution;

dispersing microparticles in the solution to obtain a dispersion;

applying the dispersion onto a substrate and then removing the solvent from the dispersion applied onto the substrate to obtain an ultra-thin polymer film; and immersing the resulting ultra-thin polymer film in a solvent that is capable of dissolving the microparticles to remove the microparticles, thereby obtaining a free-standing porous ultra-thin polymer film with a film thickness of 10 nm-1000 nm.

[13] The method according to [12] above, wherein the microparticles are at least one type selected from the group consisting of inorganic salts, silica, talc, kaolin, montmorillonite, polymers, metal oxides and metals.

[14] A method for producing a porous ultra-thin polymer film comprising the steps of: heating an ultra-thin polymer film built on a substrate to a glass-transition temperature or higher; and then compressing the ultra-thin polymer film with a separately prepared textured substrate, thereby obtaining a free-standing porous ultra-thin polymer film with a film thickness of 10 nm-1000 nm.

[15] A method for producing a porous ultra-thin polymer film comprising the steps of: dissolving a polymer as a raw material to obtain a solution; dispersing microbubbles in the resulting solution; applying the microbubble-dispersed solution onto a substrate; and removing the solvent from the solution applied onto the substrate, thereby obtaining a free-standing porous ultra-thin polymer film with a film thickness of 10 nm-1000 nm.

[16] A complex of a substrate, a water-soluble sacrificial film and a porous ultra-thin polymer film, comprising the water-soluble sacrificial film on the substrate, and the porous ultra-thin polymer film according to any one of [1], [2], [3], [4] and [5] above thereon.

[16a] A complex of a substrate, a water-soluble sacrificial film and a porous ultra-thin polymer film, comprising the water-soluble sacrificial film on the substrate, and the porous ultra-thin polymer film according to any one of [2a], [2b], [3a], [4a] and [5a] above thereon.

[17] A complex of a substrate, a porous ultra-thin polymer film and a water-soluble support membrane, comprising the porous ultra-thin polymer film according to any one of [1], [2], [3], [4] and [5] above on the substrate, and further the water-soluble support membrane on the porous ultra-thin polymer film.

[17a] A complex of a substrate, a porous ultra-thin polymer film and a water-soluble support membrane, comprising the porous ultra-thin polymer film according to any one of [2a], [2b], [3a], [4a] and [5a] above on the substrate, and the water-soluble support membrane on the porous ultra-thin polymer film.

[18] A complex of a porous ultra-thin polymer film and a water-soluble support membrane, comprising the water-soluble support membrane on the porous ultra-thin polymer film according to any one of [1], [2], [3], [4] and [5] above.

[18a] A complex of a porous ultra-thin polymer film and a water-soluble support membrane, comprising the water-soluble support membrane on the porous ultra-thin polymer film according to any one of [2a], [2b], [3a], [4a] and [5a] above.

[19] A method for producing a free-standing porous ultra-thin polymer film comprising the step of removing the water-soluble sacrificial film or the water-soluble support membrane of the complex according to any one of [16], [17] and [18] above with water to obtain a porous ultra-thin polymer film in water.

[19a] A method for producing a free-standing porous ultra-thin polymer film comprising a step of removing the water-soluble sacrificial film or the water-soluble support membrane of the complex according to any one of [16a], [17a] and [18] above with water to obtain a porous ultra-thin polymer film in water.

[20] The method for producing the porous ultra-thin polymer film according to [19] above, comprising the steps of: picking up and placing the porous ultra-thin polymer film on another substrate; and removing water from the picked up porous ultra-thin polymer film to obtain a porous ultra-thin polymer film in a dry state.

[20a] The method for producing the porous ultra-thin polymer film according to [19a] above, comprising the steps of: picking up and placing the porous ultra-thin polymer film on another substrate; and removing water from the picked up porous ultra-thin polymer film to obtain a porous ultra-thin polymer film in a dry state.

[21] A complex of a mesh and a porous ultra-thin polymer film, comprising the porous ultra-thin polymer film according to any one of [1], [2], [3], [4] and [5] above on the mesh.

[21a] A complex of a mesh and a porous ultra-thin polymer film, comprising the porous ultra-thin polymer film according to any one of [2a], [2b], [3a], [4a] and [5a] above on the mesh.

[22] A method for producing a complex of a mesh and a porous ultra-thin polymer film, comprising a step of picking up a free-standing porous ultra-thin polymer film produced by the method according to [19] above with the mesh to produce a complex of the porous ultra-thin polymer film and the mesh.

[22a] A method for producing a complex of a mesh and a porous ultra-thin polymer film, comprising a step of picking up a free-standing porous ultra-thin polymer film produced by the method according to [19a] above with the mesh to produce a complex of the porous ultra-thin polymer film and the mesh.

[23] A complex of a porous ultra-thin polymer film and a nonporous ultra-thin polymer film, comprising one or more porous ultra-thin polymer films according to any one of [1], [2], [3], [4] and [5] above and one or more nonporous ultra-thin polymer films.

[23a] A complex of a porous ultra-thin polymer film and a nonporous ultra-thin polymer film, comprising one or more porous ultra-thin polymer films according to any one of [2a], [2b], [3a], [4a] and [5a] above and one or more nonporous ultra-thin polymer films.

In addition, the present invention provides the following ultra-thin polymer film that has been phase-separated into a sea-island structure.

[A1] An ultra-thin polymer film that has been phase-separated into a sea-island structure obtained, on a substrate, by: dissolving two types of mutually-immiscible polymers, namely, a first polymer and a second polymer, in a solvent in an arbitrary proportion to obtain a solution; applying the resulting solution onto the substrate; and then removing the solvent from the solution applied onto the substrate. Here, the "first polymer" refers to a polymer that forms the island parts upon phase separation into the sea-island structure while the "second polymer" refers to a polymer that forms parts other than the island parts (sea parts).

[A2] The ultra-thin polymer film according to [A1] above, wherein the island parts of the sea-island structure have a size in a range that is larger than 1 µm and smaller or equal to 25 µm, and are present on the surface at a density of $5 \times 10^{-3}$ pores/µm$^2$-50 pores/µm$^2$.

[A3] The ultra-thin polymer film according to [A2] above, wherein the size of the pores is in a range that is smaller or equal to 15 µm.

[A4] The ultra-thin polymer film according to any one of [A1]-[A3] above, wherein the film thickness of the ultra-thin polymer film is 10 nm-1000 nm.

[A5] The ultra-thin polymer film according to any one of [A1]-[A4] above, wherein the combination of the first and second polymers is selected from the group below:
  (i) first polymer: polystyrene, and second polymer: polymethyl methacrylate;
  (ii) first polymer: polystyrene, and second polymer: poly-D/L-lactic acid;
  (iii) first polymer: polymethyl methacrylate, and second polymer: polystyrene;
  (iv) first polymer: polyethylene glycol, and second polymer: polystyrene;
  (v) first polymer: polyvinylpyrrolidone, and second polymer: polystyrene; and
  (vi) first polymer: poly-D/L-lactic acid, and second polymer: polystyrene.

The present invention also provides the following substantially disk-like ultra-thin polymer film (herein, sometimes referred to as a "nanodisc") and a method for producing the same.

[B1] A substantially disk-like ultra-thin polymer film whose film thickness is 10 nm-1000 nm and whose size is in a range of 30 nm-50 µm.

[B2] The substantially disk-like ultra-thin polymer film according to [B1] above, wherein the size is in a range that is larger than 1 µm and smaller or equal to 25 µm.

[B3] The substantially disk-like ultra-thin polymer film according to [B2] above, wherein the size is in a range that is smaller or equal to 15 µm.

[B4] The substantially disk-like ultra-thin polymer film according to any one of [B1]-[B3] above, wherein the polymer is poly-D/L-lactic acid.

[C1] A method for producing a substantially disk-like ultra-thin polymer film comprising the steps of:
  dissolving two types of mutually-immiscible polymers in a first solvent in an arbitrary proportion to obtain a solution;
  applying the resulting solution onto a substrate and then removing the first solvent from the solution applied onto the substrate to obtain an ultra-thin polymer film that has been phase-separated into a sea-island structure; and
  immersing the ultra-thin polymer film in a second solvent which is a good solvent for the polymer of the sea parts but a poor solvent for the polymer other than the sea parts to remove the sea parts, thereby obtaining a substantially disk-like ultra-thin polymer film with a film thickness of 10 nm-1000 nm and a size in a range of 30 nm-50 nm.

Effect of the Invention

The present invention is capable of providing a free-standing porous ultra-thin polymer film and a method for producing the same.

EMBODIMENTS FOR CARRYING OUT THE INVENTION

Hereinafter, the present invention will be described in detail. The scope of the present invention is not limited to these descriptions, and may be carried out according to a procedure other than the following examples through appropriate alteration without departing from the spirit of the present invention. All of the documents and publications cited herein are hereby incorporated by reference in their entirety regardless of the purposes thereof. In addition, the present specification incorporates the disclosed content of the claims, specification and figures of Japanese Patent Application No. 2012-054255 (filed on Mar. 12, 2012) based on which the present application claims priority.

Herein, an ultra-thin film may sometimes be referred to as a "nanosheet".

1. Porous Ultra-Thin Polymer Film of the Present Invention

Figure 8:
FIG. 8 Schematic cross-sectional views of a porous ultra-thin polymer film and respective complexes. (a) A porous ultra-thin polymer film 1, (b) a complex 4 of a substrate 3, a water-soluble sacrificial film 2 and the ultra-thin polymer film 1, (c) a complex 6 of a substrate 3, the porous ultra-thin polymer film 1 and a water-soluble support membrane 5, (d) a complex 7 of the porous ultra-thin polymer film 1 and a water-soluble support membrane 5, (e) a complex 9 of a mesh 8 and the porous ultra-thin polymer film 1, and (I) a complex 11 of the porous ultra-thin polymer film 1 and a nonporous ultra-thin film 10.
Figure 8:
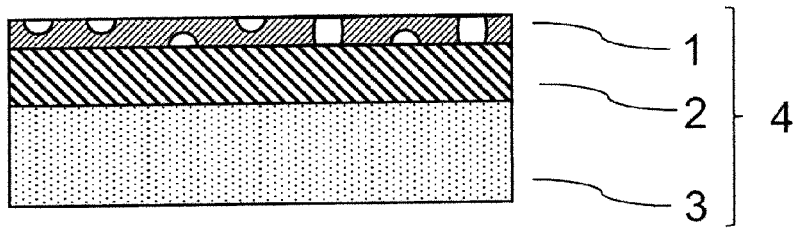
Figure 8:
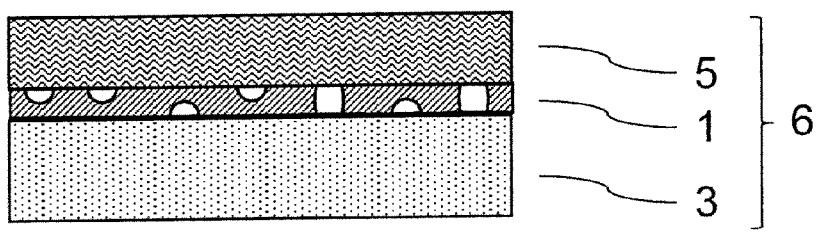
Figure 8:
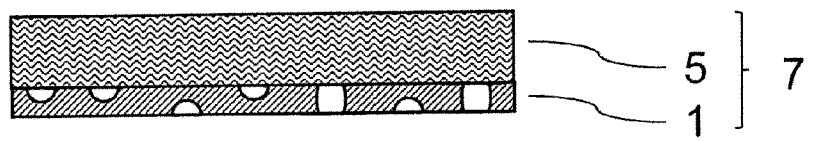
Figure 8:
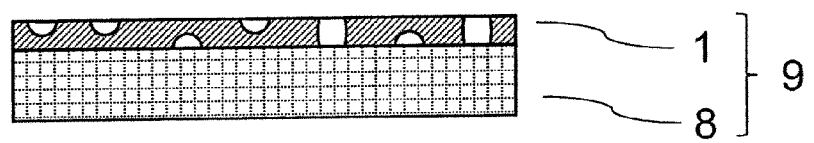
Figure 8:
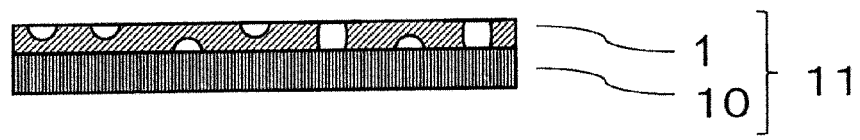

FIG. 8(*a*) shows one example of a porous ultra-thin polymer film 1 of the present invention.

A porous ultra-thin polymer film of the present invention is a free-standing ultra-thin film. The term "free-standing" refers to a property of an ultra-thin film, which means that no support is required for the ultra-thin film to maintain the film structure. This, however, does not deny that an ultra-thin film of the present invention may form a complex with a support.

The term "porous" means that a plurality of pores are provided in an ultra-thin film. Moreover, the pores may or may not penetrate through the ultra-thin polymer film. A porous ultra-thin polymer film of the present invention may have penetrating pores only, non-penetrating pores only or both of the penetrating pores and the non-penetrating pores as shown in FIG. 8(*a*). The form of such pores may appropriately be determined according to usage. A porous ultra-thin polymer film of the present invention may have pores formed in any kind of shapes such as substantially disk-like, oval, rectangular, square or the like when the surface of the film is seen from above, but in general, it is substantially disk-like. Although not shown, substantially disk-like pores may merge with each other.

A porous ultra-thin polymer film of the present invention has a film thickness of 10 nm-1000 nm. The film thickness of a porous ultra-thin polymer film of the present invention may be 10 nm-1000 nm, which may appropriately be determined according to usage, while the film thickness is preferably 20 nm-800 nm, more preferably 30 nm-600 nm, still more preferably 40 nm-400 nm, and particularly preferably 50 nm-200 nm.

A porous ultra-thin polymer film of the present invention has a plurality of pores in the surface. Herein, the term "surface" refers to the top or the back surface of an ultra-thin film. The pore density of the surface may be any density as long as there are a plurality of pores, and the pore density of the surface may appropriately be determined according to usage thereof, while the pore density of the surface (pores/$\mu m^2$) is generally 0.005 pores/$\mu m^2$-100 pores/$\mu m^2$, preferably 0.05 pores/$m^2$-50 pores/$\mu m^2$, more preferably 0.1 pores/$\mu m^2$-30 pores/$\mu m^2$, and still more preferably 0.5 pores/$\mu m^2$-20 pores/$\mu m^2$.

In the case where the pores are substantially disk-like, the pore diameter is not particularly limited and may appropriately be determined according to usage thereof, while the pore diameter is preferably 0.01 $\mu m$-500 $\mu m$, more preferably 0.03 $\mu m$-100 $\mu m$, still more preferably 0.1 $\mu m$-5 $\mu m$, and particularly preferably 0.5 $\mu m$-3 $\mu m$.

Alternatively, the pore diameter is in a range that is larger than 1 $\mu m$ and smaller or equal to 25 $\mu m$, more preferably in a range that is larger than 1 $\mu m$ and smaller or equal to 20 $\mu m$, still more preferably in a range that is larger than 1 $\mu m$ and smaller or equal to 18 $\mu m$, and particularly preferably in a range that is larger than 1 $\mu m$ and smaller or equal to 15 $\mu m$.

A plurality of pores with the same or different pore diameters may be provided in a single ultra-thin film.

When a plurality of pores with different pore diameters are provided, the pore diameter distribution may, for example, be ±10% or more. In some embodiments of the present invention, the pore diameter distribution is ±20% or more, preferably ±25% or more, more preferably ±30% or more, and still more preferably ±35% or more (for example, ±35% or more, ±40% or more, ±45% or more or ±50% or more). Furthermore, in some embodiments of the present invention, the pore diameter distribution ranges from the above-mentioned lower limit ±10% or more to, for example, ±200% or less, ±150% or less, ±100% or less, ±50% or less, ±40% or less, ±30% or less, ±20% or less or ±15% or less.

In some other embodiments of the present invention, the pore diameter distribution ranges from the above-mentioned lower limit ±20% or more (for example, ±20% or more, ±25% or more, ±30% or more, ±35% or more, ±40% or more, ±45% or more or ±50% or more) to ±200% or less or ±150% or less.

Herein, the term "pore diameter distribution" refers to a value calculated as follows. Briefly, a pore diameter distribution is calculated as $\sigma/\mu$ by approximating the distributions of the pore diameters to give the normal distribution, where the mean is $\mu$ and the deviation is $\sigma^2$.

On the other hand, when a plurality of pores with different pore diameters are provided, the pore diameter difference between the pore with the maximum pore diameter and the pore with the minimum pore diameter is generally 0.01 µm-500 µm, preferably 0.03 µm-100 µm, still more preferably 0.1 µm-5 µm, and particularly preferably 0.5 µm-3 µm.

In a preferable embodiment of a porous ultra-thin film of the present invention, the ratio of a pore diameter to a film thickness of the porous ultra-thin polymer film (pore diameter (µm)/film thickness (µm)) is, for example, 0.1-50, preferably 0.2-40, more preferably 0.3-20 and particularly preferably 0.5-15.

Moreover, the pores may be provided on both of the top and the back surfaces of the porous ultra-thin polymer film as shown in FIG. 8(a), or only on one of the surfaces (only on the top surface or only on the back surface). When the pores are provided on both of the top and the back surfaces of the porous ultra-thin polymer film, the pore density may be the same or different between the top and back surfaces. The arrangement of such pores may appropriately be determined according to usage.

A porous ultra-thin polymer film of the present invention may have any size and any shape. The size is 0.05 mm-50 cm, preferably 0.1 min-10 cm, and more preferably 0.3 mm-5 cm. The shape is not particularly limited but it may be, for example, a flat shape such as a circle, an oval, a square, a hexagon, a ribbon shape, a string shape, a multi-branched shape or a star shape, or a three-dimensional shape such as a tube, a convex, a shape of a face mask or a shape of a handprint. The shape of a porous ultra-thin polymer film may appropriately be determined according to usage.

A polymer composing a porous ultra-thin polymer film of the present invention is not particularly limited and may appropriately be selected according to usage. A polymer used for composing a porous ultra-thin polymer film of the present invention may be a polymer that is described, for example, in the following documents: Yasuhiko TABATA ed., "Biomaterial for Regenerative Medicine", Corona Publishing; Sadao ANAZAWA ed., "Dressing: New Wound Management", Herusu Shuppan; Japanese Society for Biomaterials ed., "Basis of Biomaterials"; Journal of Biomaterials, "Biomaterials utilized by making contact with blood" (feature article), Biomaterials, 22, 78-139 (2004), "Biomaterials utilized by making contact with blood (second series)" (feature article), Biomaterials, 23, 178-238 (2005); and "Biomedical Applications of Biodegradable Polymers", Journal of Polymer Science, Part B: Polymer Physics, 49, 832-864 (2011).

Preferably, a polymer composing a porous ultra-thin polymer film of the present invention is at least one selected from the group consisting of:

(i) polyhydroxyalkanoic acid such as poly-D,L-lactic acid, polyglycolic acid, hydroxybutyric acid or polycaprolactone;

(ii) a copolymer such as a copolymer of lactic acid and glycolic acid, a copolymer of 3-hydroxybutyric acid and 3-hydroxyvaleric acid, a copolymer of trimethylene carbonate and glycolide, or a copolymer of polyglycolic acid and poly-ε-caprolactone;

(iii) poly(ester-ether) such as polydioxane or poly(2-methylene-1,3,6-trioxocane);

(iv) a polyester of aliphatic dicarboxylic acid and aliphatic diol, such as polybutylene succinate, polyethylene adipate or polyethylene succinate;

(v) polyamides such as polyesteramide, polyamide 4, polyaspartic ester or polyglutamic ester or polyurethane;

(vi) a polysaccharide such as acetylcellulose, polyglucuronic acid, alginic acid or chitosan, or polysaccharide ester;

(vii) poly(acrylate) such as polymethyl acrylate, polyethyl acrylate or polybutyl acrylate;

(viii) poly(methacrylate) such as polymethyl methacrylate, polyethyl methacrylate, polycaprylyl methacrylate, polyglyceryl methacrylate, polyglucosylethyl methacrylate, polybutyl methacrylate, polypropyl methacrylate or polymethacryloyloxy ethyl phosphorylcholine;

(ix) polystyrene or polyvinyl acetate; and (x) polysiloxane such as polydimethyl siloxane;

In some embodiments of the present invention, a polymer is poly(methacrylate), preferably polymethyl methacrylate, polyethyl methacrylate or polypropyl methacrylate, and more preferably polymethyl methacrylate.

In some other embodiments of the present invention, a polymer is polyhydroxyalkanoic acid or a copolymer of polyhydroxyalkanoic acid, preferably poly-D,L-lactic acid, polyglycolic acid or a copolymer of lactic acid and glycolic acid, and more preferably poly-D,L-lactic acid.

A preferred embodiment of a porous ultra-thin polymer film of the present invention may be used, for example, as a cell culture support, a nano/microfilter, a highly light-scattering film, a cell isolation filter or the like.

The phrase "use of a porous ultra-thin polymer film as a cell support" means that it is used as a scaffolding member that allows a substance to pass therethrough, and specifically refers to a case where a porous ultra-thin polymer film is used as follows. It is used as a scaffold upon culturing cells from a stem cell to form a tissue such as skin, cornea, cardiac muscle, nerve or the like. The cells are cultured in a petri dish but efficient supply of oxygen, nutrients or the like or excretion of waste products cannot be provided from the substrate side. Therefore, there is a concern that the resulting cellular tissue may have different property from that of the original cellular tissue. Moreover, there is a limit to multi-layering since when the cell layers of a cultured tissue are simply laminated, passing of oxygen, nutrients, waste products or the like become difficult. Hence, a porous ultra-thin polymer film can be used as a scaffolding member that allows passing of a substance.

When a porous ultra-thin polymer film is used as a cell culture support, the polymer of the film is preferably polyhydroxyalkanoic acid such as poly-D,L-lactic acid, polyglycolic acid, hydroxybutyric acid or polycaprolactone, a copolymer such as a copolymer of lactic acid and glycolic acid, a copolymer of 3-hydroxybutyric acid and 3-hydroxyvaleric acid, a copolymer of trimethylene carbonate and glycolide or a copolymer of polyglycolic acid and poly-ε-caprolactone, poly(ester-ether) such as polydioxane or poly(2-methylene-1,3,6-trioxocane), or a polyester of aliphatic dicarboxylic acid and aliphatic diol, such as polybutylene succinate, polyethylene adipate or polyethylene succinate, and more preferably polyhydroxyalkanoic acid such as poly-D,L-lactic acid, polyglycolic acid, hydroxybutyric acid or polycaprolactone, or a copolymer such as a copolymer of lactic acid and glycolic acid, a copolymer of 3-hydroxybutyric acid and 3-hydroxyvaleric acid, a copolymer of trimethylene carbonate and glycolide or a copolymer of polyglycolic acid and poly-ε-caprolactone.

When a porous ultra-thin polymer film is used as a cell culture support, the film thickness is preferably 30 nm-1000 nm, more preferably 50 nm-1000 nm, still more preferably 100 nm-1000 nm, and particularly preferably 200 nm-1000 nm.

When a porous ultra-thin polymer film is used as a cell support, the pore density (pores/$\mu m^2$) of the surface of the film is generally 0.005 pores/$\mu m^2$-100 pores/$\mu m^2$, preferably 0.05 pores/$\mu m^2$-50 pores/$\mu m^2$, more preferably 0.1 pores/$\mu m^2$-30 pores/$\mu m^2$, and still more preferably 0.5 pores/$\mu m^2$-20 pores/$\mu m^2$.

When it is used as a cell culture support, an appropriate pore diameter is such that it does not allow cells of interest to penetrate therethrough but allow them to adsorb thereto, which is preferably 0.01 $\mu m$-50 $\mu m$, more preferably 0.03 $\mu m$-10 $\mu m$, still more preferably 0.1 $\mu m$-5 $\mu m$, and particularly preferably 0.5 $\mu m$-3 $\mu m$.

Furthermore, when a porous ultra-thin polymer film is used as a cell culture support, pores are preferably provided on both top and back surfaces of the film while the pore density may be the same or different between the top surface and the back surface.

Additionally, a porous ultra-thin polymer film preferably only has penetrating pores but it may have both penetrating pores and non-penetrating pores. Preferably, the shape of the porous ultra-thin polymer film is substantially disk-like, oval or the like.

The phrase "a porous ultra-thin polymer film is used as a nano/microfilter" specifically means that the porous ultra-thin polymer film is used as follows. Specifically, a porous ultra-thin film is placed on a coarse support for the purpose of controlling passing of various polymers, proteins, viruses or particles. It may be used, for example, as a virus removing film or a protein removing film.

When a porous ultra-thin polymer film is used as a nano/microfilter, the polymer of the film is poly(methacrylate), preferably polymethyl methacrylate, polyethyl methacrylate, or polypropyl methacrylate, and more preferably polymethyl methacrylate. When a porous ultra-thin polymer film is used as a nano/microfilter, the film thickness is 30 nm-1000 nm, more preferably 50 nm-1000 nm, still more preferably 100 nm-1000 nm, and particularly preferably 200 nm-1000 nm.

When a porous ultra-thin polymer film is used as a nano/microfilter, the pore density (pores/$\mu m^2$) of the surface of the film is made as high as possible but in a fit state to maintain the film strength. In general, the pore density is 0.01 pores/$\mu m^2$-100 pores/$\mu m^2$, preferably 0.05 pores/$\mu m^2$-100 pores/$\mu m^2$, more preferably 0.1 pores/$\mu m^2$-100 pores/$\mu m^2$, and still more preferably 1 pore/$\mu m^2$-100 pores/$\mu m^2$.

When a film is used as a nano/microfilter, the pore diameter should be appropriate for blocking a substance or particles of interest, which is preferably 0.001 $\mu m$-50 $\mu m$, and more preferably 0.01 $\mu m$-10 $\mu m$.

In addition, when a porous ultra-thin polymer film is used as a nano/microfilter, the pores are preferably provided on both top and back surfaces of the film while the pore densities may be the same or different between the top and back surfaces. The porous ultra-thin polymer film preferably only has penetrating pores but it may also have both penetrating pores and non-penetrating pores. In addition, the pore diameter distribution is preferably as narrow as possible. Specifically, the pore diameter distribution lies, for example, in a range of ±10% to ±40%, preferably in a range of ±10% to ±30%, more preferably in a range of +10% to ±20%, and still more preferably in a range of ±10% to ±15%.

Preferably, the shape of the porous ultra-thin polymer film is substantially disk-like, square or the like.

Alternatively, application to cell culture and use as a filter may be combined, in which case the film may be made, for example, into a sac-like shape or a pipe-like shape to be used for the purpose of culturing floating cells or blood cells therein and sorting them according to size.

The phrase "a porous ultra-thin polymer film is used as a highly light-scattering film" specifically means that the porous ultra-thin polymer film is used as follows. The porous ultra-thin polymer film of the present invention have a plurality of pores capable of scattering light. Such a highly light-scattering film can be used by being applied onto an application subject. The application subject may, for example, be a surface of a tissue outside an organism (skin, nail, hair, etc.), a surface of a tissue inside an organism (for example, internal organ, blood vessel, tumor, etc.) or the like.

Some embodiments of a porous ultra-thin polymer film of the present invention may be used by being applied onto skin for the purpose of concealing spots, bruise, moles or wrinkle of the skin.

Some of other embodiments of a porous ultra-thin polymer film of the present invention may be used by being applied onto a surface of an internal organ for the purpose of marking upon abdominal section or endoscopic surgery.

Some of further embodiments of a porous ultra-thin polymer film of the present invention may be used by being applied onto skin, nail or hair for the purpose of body painting, nail art or hair coloring.

Preferably, the porous ultra-thin polymer film of the present invention may be used by being applied onto skin for the purpose of concealing spots, bruise, moles or wrinkle of the skin.

When a porous ultra-thin polymer film is used as a highly light-scattering film, the shape and size of the film are selected such that they are appropriate for accomplishing the purpose thereof while it is preferably disk-like, polygonal, tape-like or the like. Alternatively, a dispersion of fine highly light-scattering films may be prepared to be used for spray atomization or as cream.

When a porous ultra-thin polymer film is used as a highly light-scattering film, the polymer of the film is preferably polyhydroxyalkanoic acid such as poly-D,L-lactic acid, polyglycolic acid, hydroxybutyric acid or polycaprolactone, a copolymer such as a copolymer of lactic acid and glycolic acid, a copolymer of 3-hydroxybutyric acid and 3-hydroxyvaleric acid, a copolymer of trimethylene carbonate and glycolide or a copolymer of polyglycolic acid and poly-ε-caprolactone, poly(ester-ether) such as polydioxane or poly(2-methylene-1,3,6-trioxocane), or a polyester of aliphatic dicarboxylic acid and aliphatic diol, such as polybutylene succinate, polyethylene adipate or polyethylene succinate, and more preferably polyhydroxyalkanoic acid such as poly-D,L-lactic acid, polyglycolic acid, hydroxybutyric acid or polycaprolactone, or a copolymer such as a copolymer of lactic acid and glycolic acid, a copolymer of 3-hydroxybutyric acid and 3-hydroxyvaleric acid, a copolymer of trimethylene carbonate and glycolide or a copolymer of polyglycolic acid and poly-ε-caprolactone.

When a porous ultra-thin polymer film is used as a highly light-scattering film, the film thickness of the film is selected while placing emphasis on adherence onto an application subject (for example, skin), which is preferably 20 nm-900 nm, more preferably 30 nm-500 nm, still more preferably 40 nm-300 nm, and particularly preferably 50 nm-200 nm.

When a porous ultra-thin polymer film is used as a highly light-scattering film, the pore density (pores/$\mu m^2$) of the surface of the film is generally 0.01 pores/$\mu m^2$-100 pores/$\mu m^2$, preferably 0.05 pores/$\mu m^2$-80 pores/$\mu m^2$, more preferably 0.1 pores/$\mu m^2$-50 pares/$\mu m^2$, and still more preferably 1 pore/$\mu m^2$-30 pores/$\mu m^2$.

When it is used as a highly light-scattering film, the pore diameter should be appropriate for efficiently scatting light in a broad wavelength range in random directions, which is preferably 0.01 $\mu$m-50 $\mu$m, more preferably 0.03 $\mu$m-10 $\mu$m, and still more preferably 0.1 $\mu$m-5 $\mu$m. Although a single ultra-thin film may be provided with a plurality of pores having the same or different pore diameters, a plurality of pores with different pore diameters are preferable. When a plurality of pores with different pore diameters are provided, the difference in the pore diameters between the pore with the maximum pore diameter and the pore with the minimum pore diameter is generally 0.01 $\mu$m-500 preferably 0.03 $\mu$m-100 $\mu$m, still more preferably 0.1 $\mu$m-5 $\mu$m, and particularly preferably 0.5 $\mu$m-3 $\mu$m. The distribution of the pores is preferably as large as possible so as to obtain random light scattering, which is specifically a pore diameter distribution, for example, in a range of ±20% to ±200%, preferably in a range of ±30% to +200%, more preferably in a range of ±50% to ±150%, and still more preferably in a range of +50% to ±100%.

Furthermore, the pores are preferably provided on both of the top and back surfaces of the porous ultra-thin polymer film while the pore densities may be the same or different between the top and back surfaces. Moreover, although the porous ultra-thin polymer film preferably has only penetrating pores, it may have both of the penetrating pores and the non-penetrating pores.

The phrase "use of a porous ultra-thin polymer film as a cell isolation filter" specifically means that the porous ultra-thin polymer film is used as follows. Specifically, a porous ultra-thin film is applied onto a coarse support for the purpose of controlling the passing of various cells.

When a porous ultra-thin polymer film is used as a cell isolation filter, the polymer of the film is poly(methacrylate), preferably polymethyl methacrylate, polyethyl methacrylate or polypropyl methacrylate, and more preferably polymethyl methacrylate. When a porous ultra-thin polymer film is used as a cell isolation filter, the film thickness of the film is 30 nm-1000 nm, more preferably 50 nm-1000 nm, still more preferably 100 nm-1000 nm, and particularly preferably 200 nm-1000 nm.

When a porous ultra-thin polymer film is used as a cell isolation filter, the pore density (pores/$\mu m^2$) of the surface of the film is made as high as possible but in a fit state to maintain the film strength. The pore density is generally 0.01 pores/$\mu m^2$-100 pores/$\mu m^2$, preferably 0.05 pores/$\mu m^2$-100 pores/$\mu m^2$, more preferably 0.1 pores/$\mu m^2$-100 pores/$\mu m^2$, and still more preferably 1 pore/$\mu m^2$-100 pores/$\mu m^2$.

When the film is used as a cell isolation filter, the pore diameter should be appropriate for blocking the passing of a cell of interest, which lies preferably in a range that is larger than 1 $\mu$m and smaller or equal to 25 $\mu$m, more preferably in a range that is larger than 1 $\mu$m and smaller or equal to 20 $\mu$m, more preferably in a range that is larger than 1 $\mu$m and smaller or equal to 18 $\mu$m, and particularly preferably in a range that is larger than 1 $\mu$m and smaller or equal to 15 $\mu$m.

When a porous ultra-thin polymer film is used as a cell isolation filter, the pores are preferably provided on both of the top and the back surfaces of the film while the pore densities may be the same or different between the top and the back surfaces. Moreover, although the porous ultra-thin polymer film preferably has only penetrating pores, it may have both of the penetrating pores and the non-penetrating pores. In addition, the pore diameter distribution is preferably as narrow as possible. Specifically, the pore diameter distribution lies, for example, in a range of ±10% to ±40%, preferably in a range of ±10% to ±30%, more preferably in a range of ±10% to ±20%, and still more preferably in a range of ±10% to ±15%.

Preferably, the shape of the porous ultra-thin polymer film is substantially disk-like, square or the like.

2. Complex of Substrate, Water-Soluble Sacrificial Film and Porous Ultra-Thin Polymer Film, and Complex of Substrate, Ultra-Thin Polymer Film and Water-Soluble Support Membrane A porous ultra-thin polymer film of the present invention may form a complex together with a substrate and a water-soluble sacrificial film. Such a complex is shown in FIG. 8(b) as a complex 4 comprising a substrate, a water-soluble sacrificial film and a porous ultra-thin polymer film, wherein the complex has the water-soluble sacrificial film 2 on the substrate 3, and the porous ultra-thin polymer film 1 of the present invention further thereon.

Alternatively, a porous ultra-thin polymer film of the present invention may form a complex together with a substrate and a water-soluble support membrane. Such a complex is shown in FIG. 8(c) as a complex 6 comprising a substrate, a porous ultra-thin polymer film and a water-soluble support membrane, wherein the complex has the porous ultra-thin polymer film 1 of the present invention on the substrate 3, and the water-soluble support membrane 5 further thereon.

The substrate is not particularly limited as long as it can support the porous ultra-thin polymer film, and it is generally a silicon substrate, a glass substrate, a metal substrate, polyester, polypropylene, polyethylene, polyvinyl chloride, polystyrene, polyacrylonitrile, polycarbonate, an ethylene vinyl acetate copolymer, an ethylene-vinyl alcohol copolymer, an ethylene-methacrylic acid copolymer, or a film such as a nylon film, preferably a silicon substrate, polyester, polypropylene, polyethylene or the like, and more preferably a silicon substrate, polyester or the like.

The film thickness of the substrate is generally 1 $\mu$m-5000 $\mu$m, preferably 5 $\mu$m-1000 $\mu$m, more preferably 10 $\mu$m-500 $\mu$m, still more preferably 30 $\mu$m-300 $\mu$m, and particularly preferably 50 $\mu$m-100 $\mu$m.

The porous ultra-thin polymer film of the present invention is as described above.

The water-soluble sacrificial film or the water-soluble support membrane is not particularly limited as long as it can be dissolved with water, and it is generally a polyvinyl alcohol film, a polyacrylate film, a polymethacrylate film, a sodium alginate film, a polyethylene oxide film, a polyacrylic amide film, a polyvinylpyrrolidone film, a starch film, a carboxymethyl cellulose film, a collagen film, a pullulan film, an agar film, a silicon film or the like, preferably a polyvinyl alcohol film, a polyacrylate film, a starch film, a collagen film, an agar film or the like, more preferably a polyvinyl alcohol film, a starch film, a collagen film or the like, and still more preferably a polyvinyl alcohol film.

The film thickness of the water-soluble sacrificial film is generally 5 nm-1000 nm, preferably 5 nm-500 nm, more preferably 10 nm-300 nm, still more preferably 10 nm-200 nm, and particularly preferably 10 nm-100 nm.

The film thickness of the water-soluble support membrane is generally 50 nm-20000 nm, preferably 100 nm-10000 nm, more preferably 200 nm-5000 nm, still more preferably 500 nm-5000 nm, and particularly preferably 700 nm-5000 nm.

3. Complex of Porous Ultra-Thin Polymer Film and Water-Soluble Support Membrane

A porous ultra-thin polymer film of the present invention may form a complex together with a water-soluble support membrane.

Such a complex is shown in FIG. 8(d) as a complex 7 of a porous ultra-thin polymer film and a water-soluble support membrane, wherein the complex has the water-soluble support membrane 5 on the porous ultra-thin polymer film 1 of the present invention.

When this complex is immersed in water, the water-soluble support membrane is dissolved, thereby obtaining a porous ultra-thin polymer film. The resulting porous ultra-thin polymer film is free-standing. Herein, the term "free-standing" refers to a form where the porous ultra-thin polymer film independently exists without a support.

The porous ultra-thin polymer film and the water-soluble support membrane of the present invention are as described above.

For example, the complex of the porous ultra-thin polymer film and the water-soluble support membrane can be applied onto an application subject, which is then washed with water to remove the water-soluble support membrane, thereby applying the porous ultra-thin polymer film onto the application subject.

4. Complex of Mesh and Porous Ultra-Thin Polymer Film

A porous ultra-thin polymer film of the present invention may form a complex together with a mesh.

Such a complex is shown in FIG. 8(e) as a complex 9 of a mesh and a porous ultra-thin polymer film, wherein the complex has the porous ultra-thin polymer film 1 of the present invention on the mesh 8.

The porous ultra-thin polymer film of the present invention is as described above.

The mesh may be anything as long as it is capable of supporting the porous ultra-thin polymer film of the present invention and capable of being easily peeled off from the porous ultra-thin polymer film upon application. Examples of the mesh include meshes formed from those selected from the group consisting of nylon, polyester, Teflon (registered trademark), polypropylene, silk and the like. The size of the mesh is generally 1-4000 μm, preferably 5-400 μm, more preferably 10-200 μm, and particularly preferably 40-100 μm.

The film thickness of the mesh is generally 5 μm-1000 μm, preferably 7 μm-700 μm, more preferably 10 μm-500 μm, still more preferably 30 μm-300 μm, and particularly preferably 50 μm-100 μm.

For example, the complex of the mesh and the porous ultra-thin polymer film is applied onto an application subject and then the mesh is peeled off from the porous ultra-thin polymer film, thereby easily applying the porous ultra-thin polymer film onto the application subject.

5. Complex of Porous Ultra-Thin Polymer Film and Nonporous Ultra-Thin Film

A porous ultra-thin polymer film of the present invention may form a complex together with a nonporous ultra-thin film. The term "nonporous" means that an ultra-thin film is not provided with the pores like those provided in the above-described porous ultra-thin polymer film.

This complex is shown in FIG. 8(f) as a complex 11 of a porous ultra-thin polymer film and a nonporous ultra-thin film, wherein the complex has the porous ultra-thin polymer film 1 of the present invention on the nonporous ultra-thin film 10.

The number of the porous ultra-thin polymer film in the complex may be one or more (for example, 1-20 layers, 1-10 layers or 1-5 layers) while the number of the nonporous ultra-thin film may also be one or more (for example, 1-20 layers, 1-10 layers or 1-5 layers).

The laminated order of the porous ultra-thin polymer film and the nonporous ultra-thin film in the complex is not particularly limited. When the complex comprises three or more layers, the porous ultra-thin polymer film may be included as one or more of the layers from the bottommost layer to the uppermost layer.

When two or more porous ultra-thin polymer films are comprised in the complex, the film thicknesses, the pore sizes, the pore densities, the pore diameter distributions, the ratios of the pore diameters to the film thicknesses, the materials and the like of the ultra-thin films may be different or all or some of them may be identical among the porous ultra-thin polymer films.

When two or more nonporous ultra-thin films are comprised in the complex, the film thicknesses, the materials and the like of the ultra-thin films may be different or all or some of them may be identical among the ultra-thin films.

The film thickness of a nonporous ultra-thin film is generally 10 nm-1000 nm, preferably 20 nm-800 nm, more preferably 30 nm-600 nm, still more preferably 40 nm-400 nm, and particularly preferably 50 nm-200 nm.

The material of a nonporous ultra-thin film may appropriately be selected according to usage and it is, for example, polylactic acid, a copolymer of lactic acid and glycolic acid, polyglycolic acid, polycaprolactone, silicon, dimethicone, polyvinyl acetate, carboxymethyl cellulose, polyvinylpyrrolidone, collagen, an acrylic polymer such an (alkyl acrylate/diacetone acrylamide) copolymer, an (alkyl acrylate/dimethicone) copolymer or a methacrylic polymer, polyurethane or the like, and preferably polylactic acid, a copolymer of lactic acid and glycolic acid, carboxymethyl cellulose, polyurethane or acrylic polymer.

A nonporous ultra-thin film may be produced, for example, according to a method described, for example, in WO 2006/025592, WO2008/050913, Adv. Mater. 2009, 21, 4388-4392 or the like or a method pursuant thereto.

A complex of a porous ultra-thin polymer film and a nonporous ultra-thin film may be produced by sequentially forming a porous ultra-thin polymer film (layer) and a nonporous ultra-thin film (layer) from the first place. Alternatively, it may be produced by adhering separately produced porous ultra-thin polymer film and nonporous ultra-thin film.

Such a complex may be used, for example, as the above-described highly light-scattering film.

6. Method for Producing Porous Ultra-Thin Polymer Film of the Present Invention

A porous ultra-thin polymer film of the present invention may be produced, for example, according to the following method.

(1) Method Using Two Types of Polymers

According to this method, first, two types of mutually-immiscible polymers are dissolved in a first solvent in an arbitrary proportion to obtain a solution.

The phrase "two types of mutually-immiscible polymers" refers to two types of polymers that are mutually immiscible in solid states. Hereinafter, among the two types of polymers, a polymer that forms the island parts upon phase separation into a sea-island structure is referred to as polymer 1, while a polymer other than the island parts is referred to as polymer 2. Examples of combinations of such polymers may include the combinations mentioned below.

The term "arbitrary proportion" means that the ratio (w/w) of polymer 1:polymer 2 is arbitrary, where the ratio (w/w) of polymer 1:polymer 2 may, for example, be 1:9-5:5. The ratio (w/w) of polymer 1:polymer 2 is preferably 1:9-4:6, and more preferably 1:9-3:7.

The first solvent is not limited as long as it is capable of dissolving the above-mentioned two types of polymers but generally it is at least one type of solvent selected from the group consisting of dichloromethane, diethyl ether, methyl acetate, acetone, chloroform, methanol, tetrahydrofuran, dioxane, ethyl acetate, methyl ethyl ketone, benzene, acetonitrile, isopropyl alcohol, dimethoxyethane, ethylene glycol monoethyl ether (also known as cellosolve), ethylene glycol monoethyl ether acetate (also known as cellosolve acetate), ethylene glycol mono-normal-butyl ether (also known as butyl cellosolve), ethylene glycol monomethyl ether (also known as methyl cellosolve) toluene, N,N-dimethyl formamide and dimethylacetamide. The first solvent is preferably at least one type of solvent selected from the group consisting of dichloromethane, diethyl ether, acetone, chloroform, tetrahydrofuran, dioxane, ethyl acetate, methyl ethyl ketone, acetonitrile, isopropyl alcohol, dimethoxyethane, N,N-dimethyl formamide and dimethylacetamide, more preferably at least one type of solvent selected from the group consisting of dichloromethane, acetone, tetrahydrofuran, ethyl acetate, methyl ethyl ketone, acetonitrile, isopropyl alcohol and N,N-dimethyl formamide, and more preferably at least one type of solvent selected from the group consisting of dichloromethane, tetrahydrofuran and ethyl acetate.

The total weight concentration of the polymer in the solution is generally 0.1 wt %-20 wt %, preferably 0.3 wt %-10 wt %, and more preferably 0.5 wt %-2 wt %.

Then, the resulting solution is applied onto a substrate, and the first solvent is removed from the solution applied onto the substrate, thereby obtaining an ultra-thin polymer film that has been phase-separated into a sea-island structure.

A method for applying a solution onto a substrate is not particularly limited and a solution may be applied onto a substrate, for example, by a common technique such as a spin-coating technique, a spray coating technique, a bar-coating technique, a dip coating technique or the like. Alternatively, a solution may be thinly applied onto a substrate by a common printing technique such as gravure printing, screen printing, ink jet printing or the like.

Subsequently, the first solvent is removed from the solution applied onto the substrate. A method for removing the first solvent is also not particularly limited. For example, if the solution has been applied onto the substrate by a spin-coating technique, rotation can be continued to evaporate and remove the first solvent. Alternatively, the first solvent may be evaporated and removed by heating. Alternatively, the first solvent may be removed by decompression. Alternatively, the first solvent may be removed by combining two or more of these methods for removing the first solvent.

Subsequently, the ultra-thin polymer film that has been phase-separated into a sea-island structure is immersed in a second solvent which is a good solvent for polymer 1 as the island parts but a poor solvent for polymer 2 other than the island parts to remove the island parts, thereby obtaining a porous ultra-thin polymer film.

A combination of polymer 1, polymer 2 and the second solvent may be based on the calculation of the dissolution parameters according to a method described, for example, in the document, "SP Values, Basis, Applications and Calculation Methods", Hideki YAMAMOTO, Johokiko. In this case, a combination of polymer 1, polymer 2 and the second solvent is determined according to the following guideline. Specifically, Hansen dissolution parameters for a certain polymer are plotted in a three-dimensional space, which is used as the center to form a sphere using the interaction radius of the polymer. When the Hansen dissolution parameter of the target solvent is plotted in the three-dimensional space, if the plot is inside the sphere, the target solvent is judged to be a good solvent for the polymer whereas if the plot is outside the sphere, the target solvent is judged to be a poor solvent for the polymer. According to this guideline, the first and second solvents are selected such that the first solvent is a good solvent for polymers 1 and 2 while the second solvent is a good solvent for polymer 1 but a poor solvent for polymer 2.

More specifically, examples include the following combinations.

(i) Polymer 1: polystyrene, polymer 2: polymethyl methacrylate, and second solvent: cyclohexane;

(ii) Polymer 1: polystyrene, polymer 2: poly-D/L-lactic acid, and second solvent: cyclohexane;

(iii) Polymer 1: polymethyl methacrylate, polymer 2: polystyrene, and second solvent: ethyl acetate;

(iv) Polymer 1: polyethylene glycol, polymer 2: polystyrene, and second solvent: water;

(v) Polymer 1: polyvinylpyrrolidone, polymer 2: polystyrene, and second solvent: water; or (vi) Polymer 1: poly-D/L-lactic acid, polymer 2: polystyrene, and second solvent: ethyl acetate.

Since the second solvent is a good solvent for polymer 1 but a poor solvent for polymer 2, when an ultra-thin polymer film phase-separated into a sea-island structure is immersed in the second solvent, only polymer 1 as the island parts is dissolved in the second solvent, by which the island parts are selectively removed. Accordingly, the removed regions become the pores. As a result, a porous ultra-thin polymer film can be obtained.

According to this method, the pore diameter and the pore density can be controlled by adjusting the mixed ratio (w/w) of the two types of polymers upon preparing the solution by dissolving the two types of polymers, by adjusting the rotation speed when the spin-coating technique is used as a method for applying the solution onto the substrate, by adjusting the boiling point of the first solvent, or the like.

More specifically, the pore diameter may be made larger while making the pore density lower by making the proportion (w/w) of polymer 1 in the solution for dissolving the two types of polymers (polymers 1 and 2) higher. On the other hand, the pore diameter may be made smaller while making the pore density higher by making the proportion (w/w) of polymer 1 in the solution for dissolving the two types of polymers (polymers 1 and 2) lower.

When a spin-coating technique is employed, the rotation speed can be made higher to give a smaller pore diameter and a higher pore density. On the other hand, the rotation speed can be made lower to give a larger pore diameter and a lower pore density.

By making the boiling point of the first solvent higher, the heating temperature upon spin coating can be increased to give a larger pore diameter and lower a pore density. On the other hand, the boiling point of the first solvent can be lowered to give a smaller pore diameter and a higher pore density.

By using one or a combination of two or more of the above-described methods for controlling the pore diameter and the pore density, the pore diameter and the pore density of the porous ultra-thin polymer film can arbitrarily be controlled.

In addition, the pore diameter distribution can be controlled as follows. For example, when the spin-coating technique is employed, the rotation rate upon spin coating can be decreased to increase the pore diameter distribution. On the other hand, the rotation rate upon spin coating can be increased to make the pore diameter distribution smaller.

(2) Method that Uses Two Types of Solvents

According to this method, first, a polymer as a raw material is dissolved in a mixed solvent containing a good solvent for that polymer and a poor solvent having a higher boiling point than that of the good solvent in an arbitrary proportion to obtain a solution.

Examples of combinations of a polymer, a good solvent and a poor solvent include those that are based on the calculation of the dissolution parameters according to a method described, for example, in the document, "SP Values, Basis, Applications and Calculation Methods", Hideki YAMAMOTO, Johokiko. In this case, a combination of a polymer, a good solvent and a poor solvent is determined according to the following guideline. Specifically, Hansen dissolution parameters for a certain polymer are plotted in a three-dimensional space, which is used as the center to form a sphere using the interaction radius of the polymer. When the Hansen dissolution parameter of the target solvent is plotted in the three-dimensional space, when the plot is inside the sphere, the target solvent is judged to be a good solvent for the polymer whereas if the plot is outside the sphere, the target solvent is judged to be a poor solvent for the polymer. According to this guideline, a group of good solvents and a group of poor solvents for a certain polymer are made so as to select a combination of a good solvent and a poor solvent with a boiling point higher than that of said good solvent.

More specifically, examples include the following combinations.

(i) Polymer: poly-D,L-lactic acid, good solvent: ethyl acetate, and poor solvent: dimethyl sulfoxide;

(ii) Polymer: polyglycolic acid, good solvent: 1,1,1,3,3,3-hexafluoro-2-propanol, and poor solvent: ethyl acetate;

(iii) Polymer: polycaprolactone, good solvent: tetrahydrofuran (THF), and poor solvent: isopropyl alcohol;

(iv) Polymer: polydioxane, good solvent: dichloromethane, and poor solvent: ethylene glycol;

(v) polymer: polymethyl methacrylate, good solvent: acetone, and poor solvent: water;

(vi) polymer: cellulose acetate, good solvent: THF, and poor solvent: water;

(vii) polymer: cellulose acetate, good solvent: THF, and poor solvent: toluene; or (viii) polymer: polystyrene, good solvent: THF, and poor solvent: dimethyl sulfoxide (DMSO).

The term "arbitrary proportion" means that the ratio (v/v) of good solvent:poor solvent is arbitrary, where the ratio (v/v) of good solvent:poor solvent is, for example, 100:1-100:10. The ratio (v/v) of good solvent:poor solvent is preferably 100:1-100:7, and more preferably 100:1-100:5.

The concentration of the polymer in the solution is generally 1 mg/ml-1000 mg/ml, preferably 3 mg/ml-100 mg/ml, and more preferably 5 mg/ml-50 mg/ml.

Next, the resulting solution is applied onto a substrate, and the mixed solvent is removed from the solution applied onto that substrate, thereby obtaining a porous ultra-thin polymer film.

The method for applying the solution onto the substrate is the same as described above.

The method for removing the mixed solvent from the solution applied onto the substrate is also the same as the above-described method for removing the first solvent. When the good solvent with a lower boiling point is removed from the solution applied onto the substrate, an ultra-thin polymer film dispersed with the poor solvent with a higher boiling point can be obtained transiently. Here, the poor solvent is further removed from the ultra-thin polymer film to obtain a porous ultra-thin polymer film.

According to this method, the pore diameter and the pore density can be controlled by adjusting the content of the poor solvent in the mixed solvent containing the good solvent and the poor solvent, by adjusting the rotation speed when the spin-coating technique is used as a method for applying the solution with the dissolved polymer onto the substrate, by adjusting the difference in the boiling point between the good solvent and the poor solvent, the solubility of the polymer in the poor solvent and the temperature upon preparation, or the like.

More specifically, the content of the poor solvent in the mixed solvent containing the good solvent and the poor solvent can be increased to increase the pore diameter and the pore density. On the other hand, the content of the poor solvent in the mixed solvent containing the good solvent and the poor solvent can be decreased to decrease the pore diameter and the pore density.

When a spin-coating technique is employed, the rotation speed can be made higher to give a smaller pore diameter and a higher pore density. On the other hand, the rotation speed can be made lower to give a larger pore diameter and a lower pore density.

By making the difference in the boiling point between the good solvent and the poor solvent greater, the pore diameter can be made larger while the pore density can be made lower. On the other hand, by making the difference in the boiling point between the good solvent and the poor solvent smaller, the pore diameter can be made smaller while the pore density can be made higher.

By increasing the solubility of the polymer in the poor solvent, the pore diameter can be made smaller while the pore density can be made higher. On the other hand, by decreasing the solubility of the polymer in the poor solvent, the pore diameter can be made larger while the pore density can be made lower.

By using one or a combination of two or more of the above-described methods for controlling the pore diameter and the pore density, the pore diameter and the pore density of the porous ultra-thin polymer film can arbitrarily be controlled.

In addition, the pore diameter distribution can be controlled as follows. For example, when the spin-coating technique is employed, the rotation rate upon spin coating can be decreased to increase the pore diameter distribution. On the other hand, the rotation rate upon spin coating can be increased to make the pore diameter distribution smaller.

(3) Method for Using Microparticles as Molds for Textured Polymer Film

According to this method, first, a polymer is dissolved in a solvent to obtain a solution.

The polymer composes a porous ultra-thin polymer film of the present invention, whose specific examples have been described above.

The solvent may be any solvent as long as it is capable of dissolving the polymer, examples being ethyl acetate, dichloromethane, diethyl ether, methyl acetate, acetone, chloroform, methanol, tetrahydrofuran, dioxane, methyl ethyl ketone, benzene, acetonitrile, isopropyl alcohol, dimethoxyethane, ethylene glycol monoethyl ether (also known as cellosolve), ethylene glycol monoethyl ether acetate (also known as cellosolve acetate), ethylene glycol mono-normal-butyl ether (also known as butyl cellosolve), ethylene glycol monomethyl ether (also known as methyl cellosolve) toluene, N,N-dimethyl formamide and dimethylacetamide, preferably ethyl acetate, dichloromethane, diethyl ether, acetone, chloroform, tetrahydrofuran, dioxane, methyl ethyl ketone, acetonitrile, isopropyl alcohol, dimethoxyethane, N,N-dimethyl formamide and dimethylacetamide, and more preferably ethyl acetate, dichloromethane, acetone, tetrahydrofuran, methyl ethyl ketone, acetonitrile, isopropyl alcohol and N,N-dimethyl formamide.

The concentration of the polymer in the solution is generally 1 mg/ml-1000 mg/ml, preferably 3 mg/ml-100 mg/ml, and more preferably 5 mg/ml-50 mg/ml.

Then, the resulting solution is applied onto a textured substrate and the solvent is removed from the solution applied onto the substrate, thereby obtaining a porous ultra-thin polymer film.

The textured substrate may be, for example, a substrate having a polymer thin film having dispersed and fixed microparticles, a substrate having a concave-convex pattern made by other method, or the like.

The method for applying the solution onto the substrate is the same as described above.

The method for removing the solvent from the solution applied onto the substrate is also the same as the above-described method for removing the first solvent.

Removal of the solvent from the solution applied onto the substrate gives a porous ultra-thin polymer film that has the concave-convex pattern of the substrate replicated thereon.

Here, "a substrate having a polymer thin film having dispersed and fixed microparticles" exemplified as the textured substrate may be prepared, for example, as follows. First, a polymer is dissolved in a solvent to obtain a solution. The resulting solution is used to dilute and agitate the dispersion of the microparticles. After applying the resulting diluted solution onto the substrate, the solvent is removed from the diluted solution applied onto said substrate. Thus, a substrate having a polymer thin film having dispersed and fixed microparticles can be prepared.

The microparticles generally have a diameter of 20 nm-3000 nm (preferably a diameter of 100 nm-2000 nm, and more preferably a diameter of 500 nm-1500 nm), and formed from, for example, polystyrene particles, silica particles, dextran particles, polylactic acid particles, polyurethane microparticles, polyacrylic particles, polyethyleneimine particles, albumin particles, agarose particles, iron oxide particles, titanium oxide microparticles, alumina microparticles, talc microparticles, kaolin microparticles, montmorillonite microparticles, hydroxyapatite microparticles or the like (preferably, polystyrene particles, silica particles, dextran particles, titanium oxide microparticles, talc microparticles, montmorillonite microparticles or the like). A dispersion can be obtained by dispersing these microparticles in a solvent for dissolving a polymer that forms the following polymer thin film.

A polymer that is used for forming a polymer thin film having dispersed and fixed microparticles may be, for example, polyvinyl alcohol, polyacrylic acid, polymethacrylic acid, sodium alginate, polyethylene oxide, polyacrylic amide, polyvinylpyrrolidone, starch, collagen, pullulan, agar or the like, preferably polyvinyl alcohol, polyacrylic acid, sodium alginate, polyethylene oxide, polyacrylic amide, polyvinylpyrrolidone, starch or the like, and more preferably polyvinyl alcohol, polyacrylic acid, starch or the like.

A solvent for dissolving the above-described polymer may be, for example, water, acidic water, alkaline water, methanol, ethanol or the like, and preferably water, alkaline water or the like.

The density of the microparticles in the dispersion is generally 0.1 wt %-20 wt %, preferably 0.5 wt %-10 wt %, and more preferably 1 wt %-5 wt %.

A method for applying the dispersion onto a substrate is not particularly limited, and it may be applied onto a substrate, for example, by a common technique such as a spin-coating technique, a spray coating technique, a bar-coating technique, a dip coating technique or the like. Alternatively, a solution may thinly applied onto a substrate by a common printing technique such as gravure printing, screen printing, ink-jet printing or the like.

Thereafter, the solvent is removed from the diluted solution applied onto the substrate. The method for removing the solvent is not limited but if the solution has been applied onto the substrate, for example, by a spin-coating technique, rotation can be continued to evaporate and remove the solvent. Alternatively, the solvent may be evaporated and removed by heating. Alternatively, the solvent may be removed by decompression. Alternatively, the solvent may be removed by combining two or more of these methods for removing the solvent.

The film thickness of the polymer thin film having dispersed and fixed microparticles is generally 50 nm-1500 nm, preferably 100 nm-1000 nm, and more preferably 200 nm-800 nm.

The phrase "a substrate provided with concaves and convexes by other method" may be prepared, for example, by patterning the polymer thin film used upon dispersing and fixing the above-described microparticles by a method such as lithography, printing, spraying or the like.

When the textured substrate is a substrate having a polymer thin film having dispersed and fixed microparticles, the solvent is removed from the polymer solution applied onto the substrate to form an ultra-thin polymer film. Then, the polymer thin film having dispersed and fixed microparticles may be dissolved in a solvent to peel off the porous ultra-thin polymer film from the textured substrate to obtain a free-standing porous ultra-thin polymer film. Even when a substrate provided with concaves and convexes by other method is used, a free-standing porous ultra-thin polymer film can be obtained by forming an ultra-thin polymer film and then dissolving the substrate itself.

A solvent for dissolving a polymer thin film or a substrate may be any solvent as long as it dissolves a polymer thin film but not a porous ultra-thin polymer film, which may, for example, be water, acidic water, alkaline water, methanol, ethanol or the like, or preferably water, alkaline water or the like.

The pore diameter, the pore density and the pore diameter distribution may arbitrarily be controlled by adjusting the size, the density and the size distribution of the microparticles used.

(4) Method for Using Precipitated Microparticles as Molds

According to this method, first, a polymer is dissolved in a solvent to obtain a solution.

The polymer is a polymer that composes a porous ultra-thin polymer film of the present invention, whose specific examples are as described above.

The solvent may be any solvent as long as it can dissolve the polymer, whose specific examples are as described above.

The concentration of the polymer in the solution is generally 1 mg/ml-1000 mg/ml, preferably 3 mg/ml-100 mg/ml, and more preferably 5 mg/ml-50 mg/ml.

Next, a dispersion is obtained by precipitating microparticles from a salt-dissolved solution upon concentration utilizing the difference in solubility, or alternatively by dispersing microparticles that are insoluble in the solution in advance.

The microparticles generally have a diameter of 20 nm-3000 nm (preferably a diameter of 100 nm-2000 nm, and more preferably a diameter of 500 nm-1500 nm), and they are not limited as long as they are not dissolved in a solvent for preparing a porous ultra-thin polymer film but dissolved in a solvent that does not dissolve the porous ultra-thin polymer film. The microparticles may be formed, for example, from inorganic salts (for example, lithium bromide, sodium chloride, sodium iodide, ammonium chloride, sodium hydrogen sulfate, sodium dihydrogen phosphate, calcium chloride, sodium acetate, sodium carbonate, sodium hydrogen carbonate, disodium hydrogen phosphate, calcium carbonate, calcium oxide, calcium hydroxide, potassium thiocyanate, hydroxyapatite, etc.), silica, talc, kaolin, montmorillonite, polymers (for example, polystyrene, dextran, polyphenol, polyamide, acrylics, polyethyleneimine, agarose, etc.), metal oxides (for example, alumina, iron oxide, titanium oxide, etc.) and metals (for example, silver, copper, iron, zinc, aluminum, etc.), and preferably formed from lithium bromide, calcium carbonate, silica, talc, titanium oxide or the like.

Next, the above-described dispersion is applied onto a substrate and then the solvent is removed from the dispersion applied onto the substrate to obtain an ultra-thin polymer film.

The method for applying the dispersion onto the substrate is not particularly limited, but the dispersion may be applied onto the substrate, for example, by a common technique such as a spin-coating technique, a spray coating technique, a bar-coating technique, a dip coating technique or the like. Alternatively, the solution may thinly applied onto the substrate by a common printing technique such as gravure printing, screen printing, ink-jet printing or the like.

Thereafter, the solvent is removed from the dispersion applied onto the substrate. Although the method for removing the solvent is also not limited, if the dispersion has been applied onto a substrate, for example, by a spin-coating technique, rotation can be continued to evaporate and remove the solvent. Alternatively, the solvent may be evaporated and removed by heating. Alternatively, the solvent may be removed by decompression. Alternatively, the solvent may be removed by combining two or more of these methods for removing the solvent.

Next, the resulting ultra-thin polymer film is immersed in a solvent that can dissolve the above-described microparticles to remove said microparticles, thereby obtaining a porous ultra-thin polymer film.

The term "a solvent that can dissolve microparticles" is a solvent that does not dissolve an ultra-thin polymer film but that can dissolve microparticles. The solvent may appropriately be selected according to the type of the polymer and the type of the microparticles. Specific examples of the solvents include water, acidic water, alkaline water, alcohol, dimethyl formamide, cyclohexane, acetone, ethyl acetate or the like. For example, sodium bromide can be dissolved in acetone, thiocyanated potassium can be dissolved in dimethyl formamide, metals and calcium carbonate can be dissolved in acidic water, and silica can be dissolved in alkaline water.

The solvent can dissolve and remove the microparticles. The parts where the microparticles have been removed become the pores. As a result, a porous ultra-thin polymer film can be acquired.

The pore diameter, the pore density and the pore diameter distribution may arbitrarily be controlled by adjusting the size, the density and the size distribution of the microparticles used.

(5) Method for Using Textured Substrate as Mold

According to this method, an ultra-thin polymer film built on a substrate is heated at a glass-transition temperature or higher and then said ultra-thin polymer film is compressed with a separately prepared textured substrate, thereby obtaining a porous ultra-thin polymer film.

The substrate, the polymer and the textured substrate are the same as described above.

Compression of the ultra-thin polymer film heated at a glass-transition temperature or higher with the textured substrate gives a porous ultra-thin polymer film which has replicated the concave-convex pattern of the substrate.

(6) Method for Dispersing Microbubbles

According to this method, a polymer as a raw material is dissolved in a solvent to obtain a solution and microbubbles are dispersed in the resulting solution. The microbubble-dispersed solution is applied onto a substrate and the solvent is removed from the solution applied onto the substrate, thereby obtaining a porous ultra-thin polymer film.

The polymer, the solvent, the substrate and the like are the same as described above.

The method for dispersing microbubbles in the solution may be carried out according to a known method.

After the removal of the solvent, the microbubble parts become the pores. As a result, a porous ultra-thin polymer film can be obtained.

(7) Peeling Porous Ultra-Thin Polymer Film from Substrate

In the case where a porous ultra-thin polymer film is obtained in a form of a complex with a substrate according to any of the above-described methods, the porous ultra-thin polymer film can be peeled off from the substrate to obtain a free-standing porous ultra-thin polymer film.

Examples of methods for peeling off the porous ultra-thin polymer film from the substrate include a method in which a water-soluble sacrificial film is provided between the porous ultra-thin polymer film and the substrate, and a method in which a sacrificial film which dissolves in a solvent that does not dissolve the porous ultra-thin polymer film (hereinafter, also referred to as "other sacrificial film") is provided between the porous ultra-thin polymer film and the substrate.

According to the method in which a water-soluble sacrificial film is provided between the porous ultra-thin polymer film and the substrate, the water-soluble sacrificial film is provided in advance between the porous ultra-thin polymer film and the substrate and then it is removed with water, thereby peeling off the porous ultra-thin polymer film from the substrate. Examples of the water-soluble sacrificial films include at least one film selected from the group consisting of a polyvinyl alcohol film, a polyacrylate film, a polymethacrylate film, a sodium alginate film, a polyethylene oxide film, a polyacrylic amide film, a polyvinylpyrrolidone film, a starch film, a carboxymethyl cellulose film, a collagen film, a pullulan film, an agar film, a silicon film and the like.

According to the method in which a sacrificial film which dissolves in a solvent that does not dissolve the porous ultra-thin polymer film is provided between the porous ultra-thin polymer film and the substrate, a polystyrene film, a polyolefin film, a polymethyl methacrylate film, a polyphenol film or the like is provided in advance between the porous ultra-thin polymer film and the substrate, which is then treated with cyclohexane, cyclohexane, acetone, methanol or the like, respectively, thereby peeling off the porous ultra-thin polymer film from the substrate.

The film thickness of the water-soluble sacrificial film or the other sacrificial film is generally 5 nm-1000 nm, preferably 5 nm-500 nm, more preferably 10 nm-300 nm, still more preferably 10 nm-200 nm, and particularly preferably 10 nm-100 nm. The water-soluble sacrificial film or the other sacrificial film may be formed according to a known method.

The water-soluble sacrificial film can be removed with water from the complex of the substrate, the water-soluble sacrificial film and the porous ultra-thin polymer film so as to obtain a free-standing porous ultra-thin polymer film. Briefly, the water-soluble sacrificial film can be dissolved with water to give a free-standing porous ultra-thin polymer film in water.

The thus-resulting free-standing porous ultra-thin polymer film may be picked up and placed onto another substrate and water may be removed from this picked up porous ultra-thin polymer film to obtain a porous ultra-thin polymer film in a dry state.

The term "another substrate" refers to the same substrate as described above.

Alternatively, the resulting free-standing porous ultra-thin polymer film may be picked up with a mesh to produce a complex of the porous ultra-thin polymer film and the mesh.

The term "mesh" is as described above.

(8) Support Membrane

In the case where a porous ultra-thin polymer film of the present invention is obtained in a form of a complex with a substrate according to any of the above-described methods, this porous ultra-thin polymer film may further be provided with a water-soluble support membrane thereon. By doing so, a complex of the substrate, the porous ultra-thin polymer film and the water-soluble support membrane can be obtained, where the substrate has the porous ultra-thin polymer film thereon and the porous polymer thin film, in turn, has the water-soluble support membrane thereon.

Examples of the water-soluble support membrane include at least one film selected from the group consisting of a polyvinyl alcohol film, a polyacrylate film, a polymethacrylate film, a sodium alginate film, a polyethylene oxide film, a polyacrylic amide film, a polyvinylpyrrolidone film, a starch film, a carboxymethyl cellulose film, a collagen film, a pullulan film, an agar film, a silicon film and the like.

The film thickness of the water-soluble support membrane is generally 50 nm-20000 nm, preferably 100 nm-10000 nm, more preferably 200 nm-5000 nm, still more preferably 500 nm-5000 nm, and particularly preferably 700 nm-5000 nm. The water-soluble support membrane may be formed according to a known method.

7. Ultra-Thin Polymer Film Phase-Separated into Sea-Island Structure

The present invention provides an ultra-thin polymer film that has been phase-separated into a sea-island structure (hereinafter, referred to as an "ultra-thin polymer film of the present invention"), which can be obtained, on a substrate, by: dissolving two types of mutually-immiscible polymers, namely, a first polymer and a second polymer, in a solvent in an arbitrary proportion to obtain a solution; applying the resulting solution onto the substrate; and removing the solvent from the solution applied onto the substrate.

Hereinafter, the solvent for dissolving the first and the second polymers may be referred to as a "first solvent".

The phrase "two types of mutually-immiscible polymers, namely, a first polymer and a second polymer" refers to two types of polymers which do not mix with each other in solid states. Hereinafter, among the two types of polymers, the polymer that forms the island parts upon phase separation into the sea-island structure is referred to as the first polymer while the polymer other than the island parts is referred to as the second polymer. Examples of such a combination of the first polymer and the second polymer will be recited below.

The film thickness of the ultra-thin polymer film of the present invention, similar to the porous ultra-thin polymer film of the present invention, is generally 10 nm-1000 nm. While the film thickness of the ultra-thin polymer film of the present invention may appropriately be determined according to the use thereof, it is preferably 20 nm-800 nm, more preferably 30 nm-600 nm, still more preferably 40 nm-400 nm, and particularly preferably 50 nm-200 nm.

The ultra-thin polymer film of the present invention has a plurality of island parts of the sea-island structure on its surface. Herein, the term "surface" refers to the top surface or the back surface of the ultra-thin film. The island parts on the surface may be provided at any density as long as there are multiple island parts. While the density may appropriately be determined according to usage, the density of the island parts on the surface (numbers/$\mu m^2$) is generally 0.005/$\mu m^2$-100/$\mu m^2$, preferably 0.05/$\mu m^2$-50/$\mu m^2$, more preferably 0.1/$\mu m^2$-30/$\mu m^2$, and still more preferably 0.5/$\mu m^2$-20/$\mu m^2$.

In the ultra-thin polymer film of the present invention, the island parts may be made into any shape which may, for example, be substantially disk-like, oval, rectangular, square or the like when seen from the top, but in general they are substantially disk-like. The substantially disk-like island parts may merge with each other.

While the size of the island parts of the sea-island structure in the ultra-thin polymer film of the present invention is not particularly limited and may appropriately be determined according to purpose, it has generally the same size as the pore diameter of the porous ultra-thin polymer film of the present invention. Accordingly, the size of the island parts of the sea-island structure is preferably 0.01 µm-500 µm, more preferably 0.03 µm-100 µm, still more preferably 0.1 µm-5 µm, and particularly preferably 0.5 µm-3 µm.

Alternatively, the size of the island parts of the sea-island structure is preferably in a range that is larger than 1 µm and smaller or equal to 25 µm, more preferably in a range that is larger than 1 µm and smaller or equal to 20 µm, still more preferably in a range that is larger than 1 µm and smaller or equal to 18 µm, and particularly preferably in a range that is larger than 1 µm and smaller or equal to 15 µm.

A plurality of island parts with either the same or different sizes may be provided in a single ultra-thin film.

When a plurality of island parts with different sizes are provided, the size distribution of the island parts may, for example, be ±10% or more. In some embodiments of the present invention, the size distribution of the island parts is ±20% or more, preferably ±25% or more, more preferably ±30% or more, and still more preferably ±35% or more (for example, ±35% or more, ±40% or more, ±45% or more, or ±50% or more).

Furthermore, in some embodiments of the present invention, the size distribution ranges from the above-mentioned lower limit ±10% or more to, for example, 1200% or less, ±150% or less, ±100% or less, ±50% or less, ±40% or less, ±30% or less, ±20% or less or ±15% or less.

In some other embodiments of the present invention, the size distribution ranges from the above-mentioned lower limit ±20% or more (for example, ±20% or more, ±25% or more, ±30% or more, ±35% or more, ±40% or more, ±45% or more, or ±50% or more) to ±200% or less or ±150% or less.

Herein, the term "size distribution" refers to a value calculated as follows. Briefly, a size distribution of the island parts is calculated as σ/μ by approximating the distributions of the sizes to give the normal distribution, where the mean is μ and the deviation is $σ^2$.

On the other hand, when a plurality of island parts with different sizes are provided, the size difference between the island part with the maximum size and the island part with the minimum size is generally 0.01 μm-500 μm, preferably 0.03 μm-100 μm, still more preferably 0.1 μm-5 μm, and particularly preferably 0.5 μm-3 μm.

In a preferable embodiment of an ultra-thin film of the present invention, the ratio of a island part size to a film thickness of the ultra-thin polymer film (island part size (μm)/film thickness (μm)) is, for example, 0.1-50, preferably 0.2-40, more preferably 0.3-20 and particularly preferably 0.5-15.

Moreover, the island parts may be provided on both of the top and back surfaces of the ultra-thin polymer film, similar to the pores shown in FIG. 8(a), or only on one of the surfaces (only on the top surface or only on the back surface). When the island parts are provided on both of the top and back surfaces of the porous ultra-thin polymer film, the density of the island parts may be the same or different between the top and back surfaces. The arrangement of such island parts may appropriately be determined according to usage.

An ultra-thin polymer film of the present invention may have any size and shape. The size is 0.05 mm-50 cm, preferably 0.1 mm-10 cm, and more preferably 0.3 mm-5 cm. The shape is not particularly limited but it may be, for example, a flat shape such as a circle, an oval, a square, a hexagon, a ribbon shape, a string shape, a multibranched shape or a star shape, or a three-dimensional shape such as a tube, a convex, a shape of a face mask or a shape of a handprint. The shape of an ultra-thin polymer film may appropriately be determined according to usage.

The ultra-thin polymer film of the present invention may also be used to prepare a porous ultra-thin polymer film. In this case, the ultra-thin polymer film that has been phase-separated into a sea-island structure is immersed in a second solvent which is a good solvent for the first polymer as the island parts but a poor solvent for the second polymer other than the island parts to remove the island parts, thereby obtaining a porous ultra-thin polymer film.

A combination of the first and second polymers and the second solvent may be based on the calculation of the dissolution parameters according to a method described, for example, in the document, "SP Values, Basis, Applications and Calculation Methods", Hideki YAMAMOTO, Johokiko.

In this case, a combination of the first and second polymers and the third solvent is determined according to the following guideline. Specifically, Hansen dissolution parameters for a certain polymer are plotted in a three-dimensional space, which is used as the center to form a sphere using the interaction radius of the polymer. When the Hansen dissolution parameter of the target solvent is plotted in the three-dimensional space, if the plot is inside the sphere, the target solvent is judged to be a good solvent for the polymer whereas if the plot is outside the sphere, the target solvent is judged to be a poor solvent for the polymer. According to this guideline, the first and second solvents are selected such that the first solvent is a good solvent for the first and second polymers while the second solvent is a good solvent for the first polymer but a poor solvent for the second polymer.

More specifically, examples include the following combinations.

(i) First polymer: polystyrene, and second polymer: polymethyl methacrylate;

(ii) First polymer: polystyrene, and second polymer: poly-D/L-lactic acid;

(iii) First polymer: polymethyl methacrylate, and second polymer: polystyrene;

(iv) First polymer: polyethylene glycol, and second polymer: polystyrene;

(v) First polymer: polyvinylpyrrolidone, and second polymer: polystyrene; or (vi) First polymer: poly-D/L-lactic acid, and second polymer: polystyrene.

In the case of Combination (i) above, the second solvent is, for example, cyclohexane.

In the case of Combination (ii) above, the second solvent is, for example, cyclohexane.

In the case of Combination (iii) above, the second solvent is, for example, ethyl acetate.

In the case of Combination (iv) above, the second solvent is, for example, water.

In the case of Combination (v) above, the second solvent is, for example, water.

In the case of Combination (vi) above, the second solvent is, for example, ethyl acetate.

Since the second solvent is a good solvent for the first polymer but a poor solvent for the second polymer, when an ultra-thin polymer film that has been phase-separated into a sea-island structure is immersed in it, only the first polymer as the island parts is dissolved in the second solvent and thus the island parts are selectively removed. Accordingly, the removed regions become the pores. As a result, a porous ultra-thin polymer film can be obtained.

The ultra-thin polymer film of the present invention may be produced as follows.

First, two types of mutually-immiscible polymers are dissolved in a solvent in an arbitrary proportion to obtain a solution.

The term "arbitrary proportion" means that the ratio (w/w) of first polymer:second polymer is arbitrary, where the ratio (w/w) of first polymer:second polymer may, for example, be 1:9-5:5. The ratio (w/w) of first polymer:second polymer is preferably 1:9-4:6, and more preferably 1:9-3:7.

The first solvent is not limited as long as it is capable of dissolving the above-mentioned two types of polymers but generally it is at least one type of solvent selected from the group consisting of dichloromethane, diethyl ether, methyl acetate, acetone, chloroform, methanol, tetrahydrofuran, dioxane, ethyl acetate, methyl ethyl ketone, benzene, acetonitrile, isopropyl alcohol, dimethoxyethane, ethylene glycol monoethyl ether (also known as cellosolve), ethylene glycol monoethyl ether acetate (also known as cellosolve acetate), ethylene glycol mono-normal-butyl ether (also known as butyl cellosolve), ethylene glycol monomethyl ether (also known as methyl cellosolve) toluene, N,N-dimethyl formamide and dimethylacetamide. The solvent is preferably at least one type of solvent selected from the group consisting of dichloromethane, diethyl ether, acetone, chloroform, tetrahydrofuran, dioxane, ethyl acetate, methyl ethyl ketone, acetonitrile, isopropyl alcohol, dimethoxyethane, N,N-dimethyl formamide and dimethylacetamide, more preferably at least one type of solvent selected from the group consisting of dichloromethane, acetone, tetrahydrofuran, ethyl acetate, methyl ethyl ketone, acetonitrile, isopropyl alcohol and N,N-dimethyl formamide, and more preferably at least one type of solvent selected from the group consisting of dichloromethane, tetrahydrofuran and ethyl acetate.

The total weight concentration of the polymer in the solution is generally 0.1 wt %-20 wt %, preferably 0.3 wt %-10 wt %, and more preferably 0.5 wt %-2 wt %.

Next, the resulting solution is applied onto a substrate, after which the solvent is removed from the solution applied onto the substrate, thereby obtaining an ultra-thin polymer film that has been phase-separated into a sea-island structure.

A method for applying the solution onto the substrate is not particularly limited and the solution may be applied onto the substrate, for example, by a common technique such as a spin-coating technique, a spray coating technique, a bar-coating technique, a dip coating technique or the like. Alternatively, a solution may be thinly applied onto the substrate by a common printing technique such as gravure printing, screen printing, ink-jet printing or the like.

Subsequently, the solvent is removed from the solution applied onto the substrate. A method for removing the solvent is also not particularly limited. For example, if the solution has been applied onto the substrate by a spin-coating technique, rotation can be continued to evaporate and remove the solvent. Alternatively, the solvent may be evaporated and removed by heating. Alternatively, the solvent may be removed by decompression. Alternatively, the solvent may be removed by combining two or more of these methods for removing the solvent.

According to this method, the size and the density of the island parts can be controlled by adjusting the mixed ratio (w/w) of the two types of polymers upon preparing the solution for dissolving the two types of polymers, by adjusting the rotation speed if the spin-coating technique is used as a method for applying the solution onto the substrate, by adjusting the boiling point of the solvent, or the like.

More specifically, the proportion (w/w) of the first polymer in the solution containing the two types of polymers (first and second polymers) can be made higher to increase the size of the island parts while decreasing the density of the island parts. On the other hand, the proportion (w/w) of the first polymer in the solution containing the two types of polymers (first and second polymers) can be made lower to decrease the size of the island parts while increasing the density of the island parts.

If a spin-coating technique is employed, the rotation speed can be made higher to give a smaller size and a higher density of the island parts. On the other hand, the rotation speed can be made lower to give a larger size and a lower density of the island parts.

By making the boiling point of the first solvent higher, the heating temperature upon spin coating can be increased to give a larger size and a lower density of the island parts. On the other hand, the boiling point of the solvent can be lowered to give a smaller size and a higher density of the island parts.

By employing one or a combination of two or more of the above-described methods for controlling the size and the density of the island parts, the size and the density of the island parts of the ultra-thin polymer film can arbitrarily be controlled.

In addition, the size distribution of the island parts can be controlled as follows. For example, if the spin-coating technique is employed, the rotation rate upon spin coating can be decreased to increase the size distribution of the island parts. On the other hand, the rotation rate upon spin coating can be increased to make the size distribution of the island parts smaller.

8. Nanodisc Mer Film Having Island Parts Obtained by Dissolving Sea Parts of Sea-Island Structure By reversing the ratio of first polymer:second polymer described in the above section "7. Ultra-thin polymer film phase-separated into sea-island structure", the composition of the sea-island polymer can be reversed.

Figure 12:
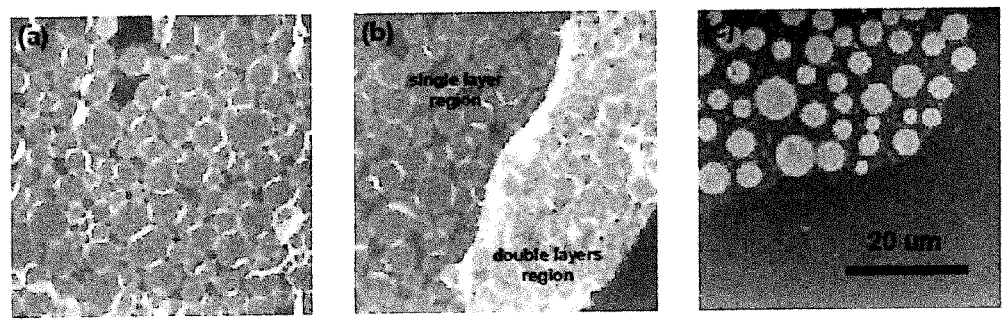
FIG. 12 AFM images of PDLLA nanodiscs. (a), (b) AFM images of monolayer PDLLA nanodiscs, and (c) an AFM image of a bilayer PDLLA nanodisc.

For example, according to the above-described example, in the case of (vi), i.e., first polymer: poly-D/L-lactic acid and second polymer: polystyrene, cyclohexane can be used as the second solvent to obtain the disk-like ultra-thin polymer film of the example shown in FIG. 12.

In a case where a second solvent which is a poor solvent for the first polymer but a good solvent for the second polymer is selected for immersing the ultra-thin polymer film that has been phase-separated into a sea-island structure, only the second polymer as the sea parts is dissolved in the second solvent, by which the sea parts are selectively removed. As a result, an ultra-thin polymer film composed of the island parts, namely, a nanodisc, can be obtained.

The resulting nanodisc will have the dimensions of the island parts described in the above section "7. Ultra-thin polymer film phase-separated into sea-island structure".

EXAMPLES

Hereinafter, the present invention will be described more specifically by way of examples, although the present invention should not be limited to these examples.

Example 1-1: Method Using Two Types of Polymers

Polystyrene (PS) and polymethyl methacrylate (PMMA) were purchased from Chemco Scientific Co., Ltd. and Sigma-Aldrich, respectively. Their characteristics are shown in Table 1. As polyvinyl alcohol (PVA, 10 mg/mL), one with a molecular weight Mw of ca. 22 kDa was purchased from Kanto Chemicals Co. These polymers were used without purification.

TABLE 1

| Characteristics and physical properties of PS and PMMA (in bulk states) | | | | |
|---|---|---|---|---|
| Polymers | Mw (kDa) | Mw/Mn | Density at 25° C. (g/cm$^3$) | Tg (° C.) |
| PS | 170 | 1.06 | 1.05 | 100 |
| PMMA | 120 | 1.8-2.0 | 1.19 | 105 |

A silicon (100) wafer, namely, an oxide coating layer, with a thickness of 200 nm was purchased from KST World Co., cut into 20×20 mm² and used as a substrate. The substrate was immersed in sulfuric acid and 30% hydrogen peroxide (3:1, v/v) at 120° C. for 10 minutes, washed with ion-exchange water (18 MΩ cm), and dried in a nitrogen stream. The contact angle of water was confirmed to be 44.5° with a contact angle measurement device (DM-301, Kyowa Interface Science Co., Ltd.).

PS and PMMA were dissolved in dichloromethane at different weight ratios (PS: PMMA=0:10, 1:9, 2:8 and 3:7 w/w) to give mixed solutions. The total weight concentrations of the polymers in the solutions were 10 mg/mL, and polymer blend nanosheets were prepared with spin coater MS-A100 (MIKASA Co., Ltd.).

First, an aqueous PVA solution (1.0 wt %) was spin-coated on the silicon substrate at a rotation speed of 3000 rpm to produce a sacrificial film, on which a polymer blend solution was spin-coated at the rotation speed of 1000, 3000, 5000 or 7000 rpm for 60 seconds. The resultant was immersed in ion-exchange water together with the substrate to dissolve the PVA sacrificial film, by which the free-standing polymer blend nanosheet began to peel off. The sheet was manipulated with tweezers to be picked up and placed onto a silicon substrate with either top or back surface facing up. Cyclohexane is a good solvent for PS but a poor solvent for PMMA. When the polymer blend nanosheet on the silicon substrate was immersed together with the substrate in cyclohexane, only the PS regions were selectively removed. This was carried out for both top and rear surfaces and the surface structures were observed. All of the manipulations were conducted in a clean room (class 10,000 conditions) at room temperature (25° C.) and humidity (35% RH).

In order to observe the surface structures, an intermolecular force microscope (KEYENCE VN-8000 NANOSCALE hybrid microscope) and a field emission-type electron microscope (FE-SEM, Hitachi S-5500) were used. The former was used with a silicon-made cantilever (KEYENCE, OP-75041) in a tapping mode (1.67-3.33 Hz) to scan the surfaces of the nanosheets. The AFM images were processed with VN Analyzer (KEYENCE) and ImageJ (NIH) software. The latter was used for observing the cross-sections of the nanosheets. The nanosheets were immersed in liquid nitrogen for 10 minutes for freeze-fracture. The cross-section was spattered with gold-palladium (Au—Pd) and observed at an accelerating voltage of 5 kV. The image was processed with ImageJ software.

Figure 1:
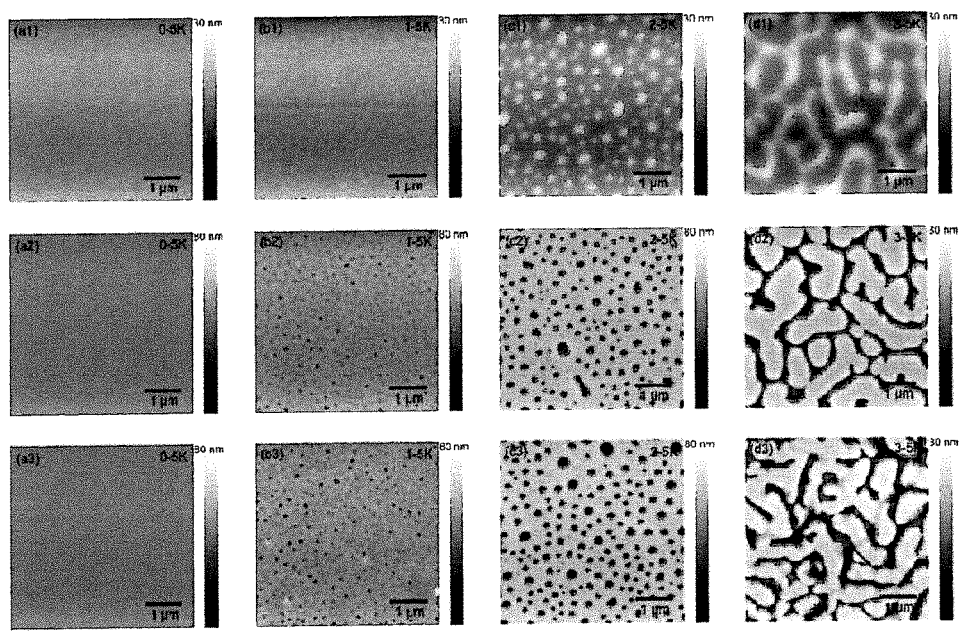
FIG. 1 AFM images of PS/PMMA blend nanosheets that were prepared at a rotation speed of 5000 rpm. Images after the film formation (top row), the top surfaces after the treatment with the solvent (middle row), and the back surfaces after the treatment with the solvent (bottom row). PS:PMMA (w/w) were 0:10 (left column), 1:9 (second column), 2:8 (third column) and 3:7 (fourth column).

Typical AFM images are shown in FIG. 1 where the PS:PMMA ratios of the polymer blend solutions were 0:10, 1:9, 2:8 and 3:7 w/w, and the rotation rate was 5000 rpm. The images (a1)-(d1) in the top row in FIG. 1 are the AFM images of the polymer blend nanosheets made of PS and PMMA. The bright regions are the phase-separated PS regions. The images (a2)-(d2) in the middle row in FIG. 1 are the AFM images of the top surfaces of the nanosheets whose PS regions have been dissolved with cyclohexane to leave the PMMA regions. The bright regions in the top row can be appreciated to have become dark. These are the pores resulting from the removal of the PS regions. The images (a3)-(d3) in the bottom row in FIG. 1 are the AFM images of the rear surfaces of the nanosheets whose PS regions have been dissolved with cyclohexane to leave the PMMA regions. Since both top and rear surfaces have similar structure, the pores are suggested to be passing through.

The AFM images in FIG. 1 show the nanosheets with the PS:PMMA ratios of (a) 0:10, (b) 1:9, (c) 2:8 and (d) 3:7 (w/w), respectively, from the left. In the case of the PMMA homopolymer nanosheet, the top surface was flat and no phase separation structure could be found. In addition, no porous structure was found with cyclohexane treatment. On the other hand, phase separation structures were observed in the PS/PMMA blend nanosheet while the total area of the phase-separated PS regions increased with the increase in the proportion of PS. The pores were minute and numerous at the PS:PMMA ratio of 1:9 whereas the pores merged with each other and became larger and less in number at the PS:PMMA ratio of 2:8. At the PS:PMMA ratio of 3:7, the pores completely merged with each other and formed intricate grooves.

Figure 2:
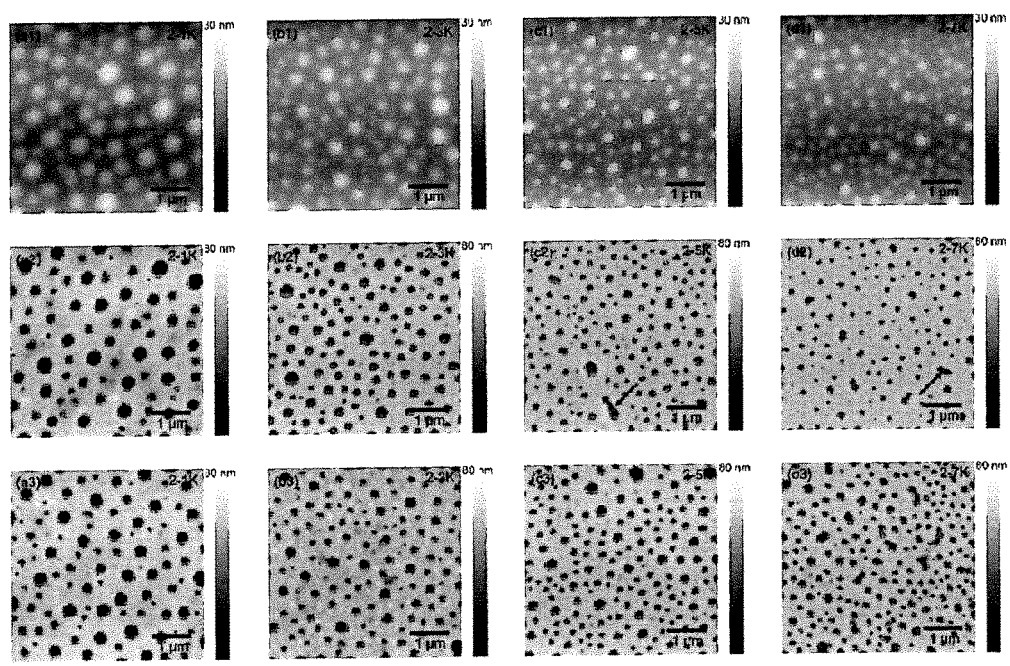
FIG. 2 AFM images of PS/PMMA blend nanosheets that were prepared with PS:PMMA (w/w) in 2:8. Images after the film formation (top row), the top surfaces after the treatment with the solvent (middle row), and the back surfaces after the treatment with the solvent (bottom row). Rotation speeds (rpm) were 1000 (left column), 3000 (second column), 5000 (third column) and 7000 (fourth column).

FIG. 2 shows AFM images of the nanosheets prepared from a polymer blend solution prepared at a PS:PMMA ratio of 2:8 (w/w) and the rotation speeds of 1000, 3000, 5000 and 7000 rpm, respectively, where definitions for the top, middle and bottom rows are the same as those shown in FIG. 1. Although the total area of the phase-separated PS remains unchanged, the number of pores tended to increase while the size of the pores tended to decrease with the increase in the rotation speed, with respect to the density and the size of the pores obtained at the rotation speed of 1000 rpm. This was considered to be due to faster drying and fixing before the phase-separated PS regions merge and become larger since higher rotation speed results in faster drying of the nanosheets. At varied rotation speeds, the average sizes of the pores in the top and the back surfaces were 187.2±33.9/194.1±72.9 (top surface/back surface) at 1000 rpm, and 105.4±25.1/108.2±20.9 nm (top surface/back surface) at 7000 rpm.

Table 2 summarizes the film thicknesses, the pore diameters and the pore densities of the nanosheets prepared at the PS:PMMA ratios of 1:9 and 2:8 and the rotation speeds of 1000, 3000, 5000 and 7000 rpm. The film thickness tended to decrease with the rotation speed. The mixture ratio of 2:8 showed a tendency to give thicker sheets. The pore diameters were larger at 2:8 than 1:9, which tended to decrease with the rotation speed. The pore density was smaller at 2:8 than 1:9, which tended to increase with rotation speed.

Furthermore, the pore diameter distribution tended to increase with the decrease in the rotation rate upon spin coating.

TABLE 2

| | Polymer mixture ratio | | | | | | | |
|---|---|---|---|---|---|---|---|---|
| | PS:PMMA = 1:9 w/w | | | | PS:PMMA = 2:8 w/w | | | |
| | Rotation speed | | | | | | | |
| | 1000 rpm | 3000 rpm | 5000 rpm | 7000 rpm | 1000 rpm | 3000 rpm | 5000 rpm | 7000 rpm |
| Film thickness (nm) | 97.6 ± 1.3 | 56.7 ± 1.9 | 42.6 ± 0.7 | 38.1 ± 1.1 | 110.2 ± 2.0 | 60.6 ± 2.9 | 44.4 ± 1.0 | 40.4 ± 1.3 |
| Pore diameter (nm) | 102.2 ± 25.4 | 77.2 ± 15.5 | 70.2 ± 11.2 | 66.0 ± 9.5 | 190.7 ± 53.4 | 136.4 ± 34.5 | 115.3 ± 30.0 | 106.8 ± 23.2 |

TABLE 2-continued

| | Polymer mixture ratio | | | | | | | |
|---|---|---|---|---|---|---|---|---|
| | PS:PMMA = 1:9 w/w | | | | PS:PMMA = 2:8 w/w | | | |
| | Rotation speed | | | | | | | |
| | 1000 rpm | 3000 rpm | 5000 rpm | 7000 rpm | 1000 rpm | 3000 rpm | 5000 rpm | 7000 rpm |
| Pore diameter distribution value | 24.9% | 20.1% | 16.0% | 14.4% | 28.0% | 25.3% | 26.0% | 21.7% |
| Pore density (/μm$^2$) | 11.6 | 23.4 | 27.5 | 28.0 | 4.8 | 7.3 | 8.8 | 8.2 |

Figure 3:
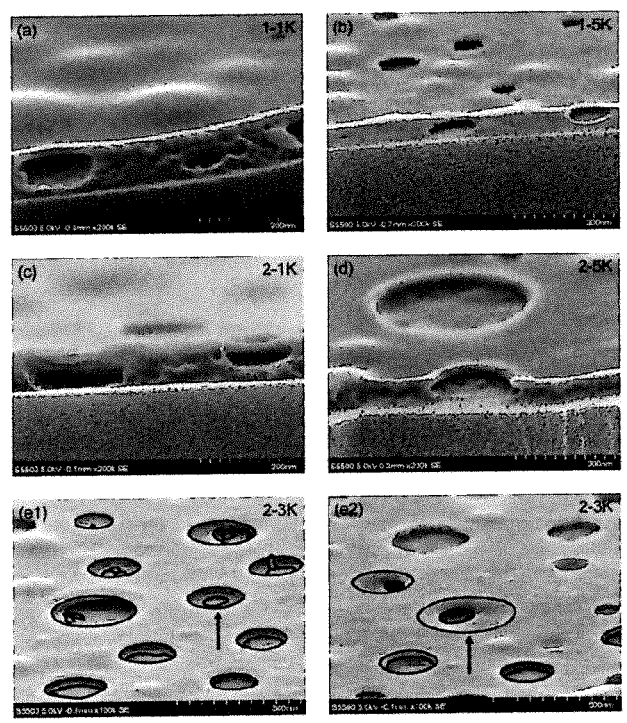
FIG. 3 SEM images of porous nanosheets obtained under the respective preparation conditions. (a) 1:9 w/w, 1000 rpm (cross-section); (b) 1:9 w/w, 5000 rpm (cross-section); (c) 2:8 w/w, 1000 rpm (cross-section); (d) 2:8 w/w, 5000 rpm (perspective images of the top surface); and (e) 2:8 w/w, 3000 rpm (perspective images of the top surface).

A scanning electron microscope (SEM) was used to collect the information of the cross-sections and the pores in the depth direction for the of porous nanosheets obtained by treating PS/PMMA blend nanosheets with cyclohexane (FIG. 3). As can be appreciated from the cross-sectional images, the PS regions have flat oval structures distributed in the nanosheets. When the PS regions exposed at the surface of the nanosheet are removed with cyclohexane, they results in pores. When a PS region exposed at both top and rear surfaces is removed with cyclohexane, it forms a penetrating pore. Moreover, when a PS region retained within the film is removed with cyclohexane, a cavity is found to be formed inside the film. When the surfaces of the nanosheets are obliquely seen with a SEM one by one, pores having different sizes at the top and back surfaces exist. This is considered to result from reflecting the difference in the exposure of the phase-separated flat oval PS regions between the top and the rear surfaces of the nanosheet.

Hence, two types of polymers that are mutually immiscible in solid states are dissolved in a common solvent, which is casted to obtain a blend nanosheet that has been phase-separated into a sea-island structure and treating with a good solvent for the polymer making up the island parts to produce a porous nanosheet.

Example 1-2: Method Using Two Types of Polymers

PS (Mw: 1701(D)) and poly-D,L-lactic acid (Mw: 300 kD) were dissolved in ethyl acetate at different weight ratios (PS:poly-D,L-lactic acid=3:7 w/w) to give a mixed solution. The total weight concentration of the polymer in the solution was 10 mg/mL and a polymer blend nanosheet was prepared with spin coater MS-A100 (MIKASA Co., Ltd.).

First, an aqueous PVA solution (10 mg/mL) was spin-coated on a silicon substrate at a rotation speed of 3000 rpm to generate a sacrificial film, on which a polymer blend solution was spin-coated at a rotation speed of 1000, 3000, 5000 or 7000 rpm for 60 seconds. When the resultant was immersed in ion-exchange water together with the substrate, the PVA sacrificial film was dissolved, by which the free-standing polymer blend nanosheet began to peel off. The sheet was manipulated with tweezers to be picked up and placed onto a silicon substrate with the top surface facing up.

Cyclohexane is a good solvent for PS but a poor solvent for poly-D,L-lactic acid. When the polymer blend nanosheet on the silicon substrate is immersed together with the substrate in cyclohexane, only the PS regions were selectively removed. All of these manipulations were carried out in a clean room (class 10,000 conditions) at room temperature (25° C.) and humidity (35% RH).

Figure 4:
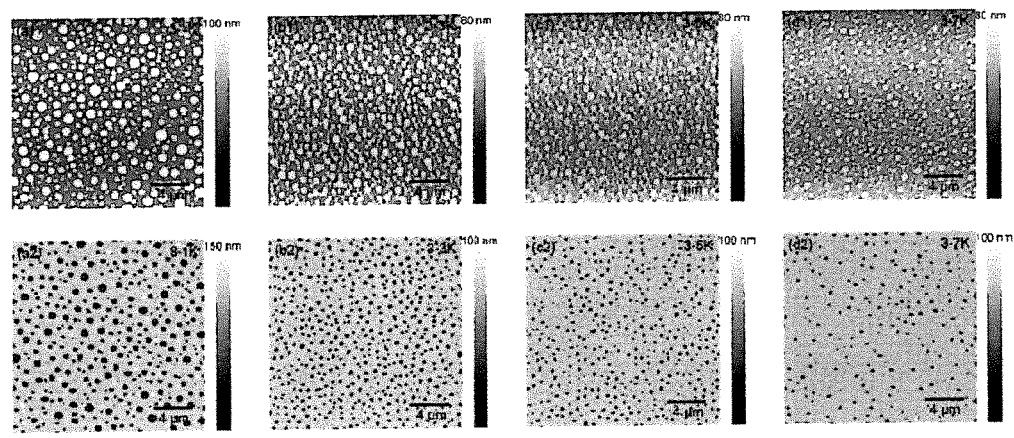
FIG. 4 AFM images of PS/D,L-PLA blend nanosheets prepared with PS:D,L-PLA (w/w) in 3:7. Images after the film formation (top row) and the surfaces after the treatment with the solvent (bottom row). Rotation speeds (rpm) were 1000 (left column), 3000 (second column), 5000 (third column) and 7000 (fourth column).

The results are shown in FIG. 4 and Table 3. The top row in FIG. 4 show the phase separation states of the nanosheets prior to the cyclohexane treatment, the bottom row show the nanosheets with pores made by cyclohexane treatment. The nanosheets prepared at the rotation speeds of 1000, 3000, 5000 and 7000 rpm, respectively are shown from the left. With reference to Table 2, the film thickness can be found to become thinner with the increase in the rotation speed. In addition, the pore diameter tends to become smaller while the pore density tends to become higher with the increase in the rotation speed.

Furthermore, the pore diameter distribution was found to have a tendency to increase with the decrease in the rotation rate upon spin coating.

TABLE 3

| | Polymer mixture ratio PS:D,L-PLA = 3:7 w/w | | | |
|---|---|---|---|---|
| Rotation speed | 1000 rpm | 3000 rpm | 5000 rpm | 7000 rpm |
| Film thickness (nm) | 76.8 ± 2.3 | 40.8 ± 2.6 | 32.6 ± 1.3 | 26.2 ± 0.8 |
| Pore diameter (μm) | 0.49 ± 0.24 | 0.33 ± 0.15 | 0.24 ± 0.10 | 0.23 ± 0.11 |
| Pore diameter distribution value | 49.0% | 45.5% | 41.7% | 47.8% |
| Pore density (/μm2) | 1.2 | 2.4 | 2.7 | 2.9 |

Example 2: Method Using Two Types of Solvents

All of the manipulations were carried out by providing a spin coater (Opticoat MS-A 100, MIKASA) in a clean room (class 10,000). A silicon substrate (KST World) was cut into 2.0 cm×2.0 cm, immersed in sulfuric acid/30% hydrogen peroxide water (3/1, v/v) at 120° C. for 10 minutes and then washed with deionized water (resistivity 18 MS/cm). Mixed solvents of ethyl acetate and dimethyl sulfoxide (DMSO) (ethyl acetate:DMSO=100:1, 100:3 and 100:5, v/v) was used to adjust poly-D,L-lactic acid (Mw: 300 kDa) to have final concentrations of 30 mg/mL. The substrate was placed in the spin coater, each of the prepared solutions were dropped and subjected to spin coating at the rotation speed of 1000, 3000, 5000 or 7000 rpm for 60 seconds (room temperature 32° C., humidity 32%). The prepared nanosheets visually had white spots.

Figure 5:
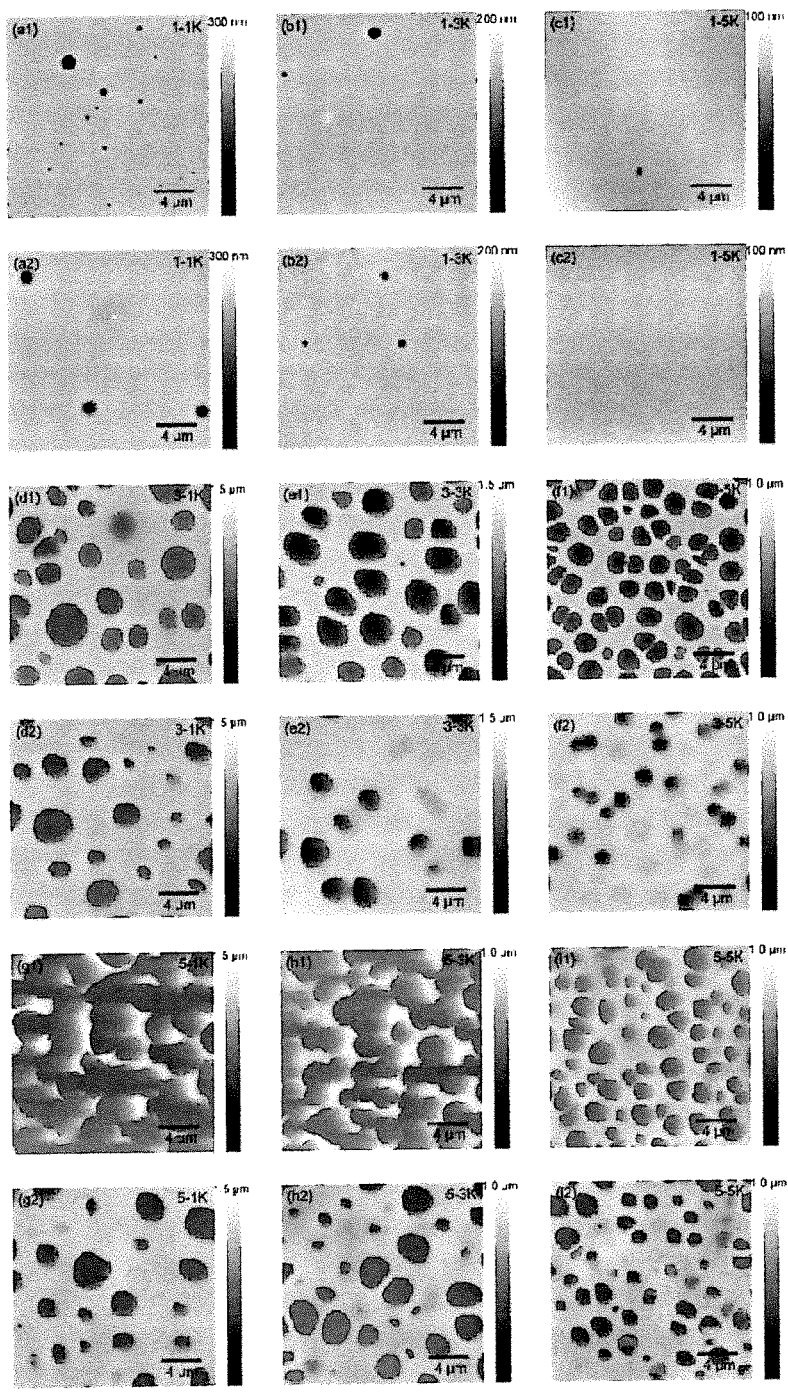
FIG. 5 AFM images of D,L-PLA porous nanosheets obtained by a method using a mixed solvent. The top and the rear surfaces with ethyl acetate:DMSO (v/v) in 100:1 (top and second rows), the top and the rear surfaces with ethyl acetate:DMSO (v/v) in 100:3 (third and fourth rows), and the top and the rear surfaces with ethyl acetate: DMSO (v/v) in 100:5 (fifth and sixth rows). Rotation speeds (rpm) were 1000 (left column), 3000 (middle column) and 5000 (right column).

An aqueous polyvinyl alcohol solution (Mw: 22,000, Kanto Chemical, 100 mg/mL) was dropped on the formed poly-D,L-lactic acid nanosheet on the silicon substrate. A PVA film as a support membrane was formed on the poly-D,L-lactic acid nanosheet, and dried using a hot plate (HOT PLATE NHP-M20, NISSIN) (30° C., 15 minutes). Subsequently, the poly-D,L-lactic acid nanosheet together with the PVA film was peeled off from the silicon substrate, and subjected to vacuum drying using a vacuum dryer (KVO-300, AS ONE) (overnight). The structure of the top surface was scanned using an intermolecular force microscope (KEYENCE VN-8000 NANOSCALE hybrid microscope) with a silicon-made cantilever (KEYENCE, OP-75041) in a tapping mode (1.67-3.33 Hz). The AFM images were processed with a VN Analyzer (KEYENCE) and ImageJ (NIH) software. In FIG. 5, the images in the top row (a1)-(c1) and the second row (a2)-(c2) show top and back surfaces of ethyl acetate:DMSO at 100:1, the images in the third row (d1)-(f1) and the fourth row (d2)-(f2) show top and back surfaces of ethyl acetate:DMSO at 100:3, the images in the fifth row (g1)-(i1) and the sixth row (g2)-(i2) show top and back surfaces of ethyl acetate:DMSO at 100:5. In FIG. 5, the rotation speeds are 1000, 3000 and 5000 rpm, respectively, from the left. Additionally, Table 4 summarizes characteristics of nanosheets obtained when the rotation speeds were altered for the three types of systems with different mixed solvent ratios.

TABLE 4

| | Solvent mixture ratio | | | | | |
|---|---|---|---|---|---|---|
| | ethyl acetate:DMSO = 100:3 v/v | | | 100:1 v/v | 100:3 v/v | 100:5 v/v |
| | Rotation speed | | | | | |
| | 1000 rpm | 3000 rpm | 5000 rpm | | 3000 rpm | |
| Film thickness (nm) | 583.8 ± 48.8 | 296.8 ± 18.0 | 241.0 ± 18.4 | 275.1 ± 17.7 | 296.8 ± 18.0 | 413.8 ± 31.3 |
| Pore diameter (μm) | 2.1 ± 1.0 | 1.8 ± 1.1 | 1.6 ± 0.6 | 0.6 ± 0.3 | 1.8 ± 1.1 | N.D. |
| Pore diameter distribution value | 47.6% | 61.1% | 37.5% | 50.0% | 61.1% | N.D. |
| Pore density (×10$^{-3}$/μm$^2$) | 75.0 | 90.0 | 107.5 | 8.8 | 90.0 | N.D. |

The film thickness tends to decrease with the increase in the rotation speed while the film thickness tends to increase with the increase in the amount of DMSO.

With respect to the total area of the pores, in the case of ethyl acetate:DMSO ratio of 100:1, the pore density was considerably low and pore formation was found to become difficult with the increase in the rotation speed. In the case of ethyl acetate:DMSO ratio of 100:3, the pore densities were 0.075/μm$^2$ (1000 rpm), 0.090/μm$^2$ (3000 rpm) and 0.11/μm$^2$ (5000 rpm), respectively, all of which gave good porous nanosheets, and the pore densities were confirmed to increase with the increase in the rotation speed. Furthermore, the pore diameters were 2.1 μm (1000 rpm), 1.8 μm (3000 rpm) and 1.6 μm (5000 rpm), respectively, which tended to decrease with the increase in the rotation speed. In the case of 100:5, the pores that became larger due to a lower rotation speed merged with each other which rendered determination of the pore density difficult. Determinations of the pore diameter and the pore density were possible at 5000 rpm. In addition, the conditions of the pores differed between the top and the back surfaces, where the pore density and diameter were larger at the top surface, with the total pore area being larger at the top surface than at the back surface. This seems to be due to the loss of DMSO from the top surface. Similarly, in the 100:5 system, porous structures could be confirmed at the rear surfaces at 1000 rpm and 3000 rpm. In general, increase in the rotation rate showed a tendency to reduce the size of the pores and increase the number of the pores. Additionally, increase in the content of the poor solvent (DMSO) increased both the size and the number of the micropores.

In addition, decrease in the rotation rate upon spin coating tended to increase the pore diameter distribution.

Accordingly, when a polymer for making up the nanosheet was dissolved in a mixed solvent of a good solvent with a low boiling point and a slight amount of a poor solvent with a high boiling point, and the resultant was then casted by spin coating, a nanosheet having the poor solvent dispersed therein was obtained upon removal of the good solvent with a low boiling point. Subsequently, a porous nanosheet was obtained upon removal of the poor solvent.

Example 3: Method Using Microparticles as Molds for Textured Polymer Film

All of the manipulations were conducted by placing a spin coater (Opticoat MS-A 100, MIKASA) in a clean room (class 10,000). A silicon substrate (KST World) was cut into 2 cm×2 cm, immersed in sulfuric acid/30% hydrogen peroxide water at 120° C. for 10 minutes and then washed with deionized water (resistivity 18MΩcm).

polystyrene (PS) microparticles (diameter 913 nm) dispersion (Polysciences) was ten-fold diluted in an aqueous polyvinyl alcohol solution (Mw: 22,000, Kanto Chemical, 125 mg/mL) and agitated using a vortex mixer (VOATEX-2-GENIE, G-560, Scientific Industries). The substrate was placed in the spin coater, a prepared solution was dropped thereon and then subjected to spin coating (1000, 2000, 3000 and 5000 rpm) for 60 seconds (room temperature 28° C., humidity 26%).

Subsequently, ethyl acetate was used as a solvent to adjust poly-D,L-lactic acid (Mw: 300 kDa) to have a final concentration of 30 mg/ml. The prepared poly-D,L-lactic acid solution was spin-coated (3000 rpm, 60 seconds) on the PS microparticle-fixed PVA film that was prepared earlier to produce a film (room temperature 28° C., humidity 26%). This composite nanosheet was immersed in pure water to dissolve the PVA film and the PS microparticles to obtain a porous poly-D,L-lactic acid nanosheet. The porous film was placed in water once and in a free-standing state, then picked up and placed on a silicon substrate with either the top or the back surface facing up, and dried.

Figure 6:
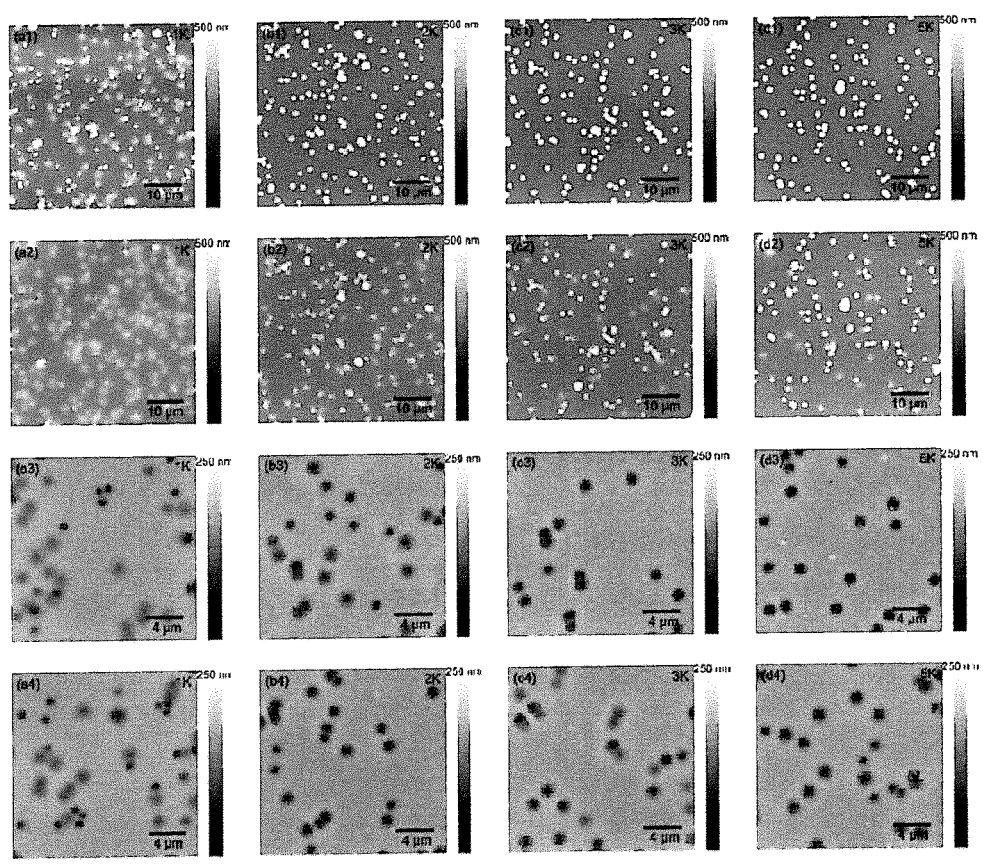
FIG. 6 AFM images of D,L-PLA nanosheets having PS microparticles applied onto textured substrates. The PS microparticle-fixed PVA films prepared at respective rotation speeds (top row), the films obtained by compositing D,L-PLA nanosheets with the respective PVA films (second row), and the top surface (third row) and the rear surface (fourth row) of the porous D,L-PLA nanosheets after treating them through immersion in water. The rotation speeds (rpm) were 1000 (left column), 2000 (second column), 3000 (third column) and 5000 (fourth column).

Measurement of the film thickness and observation of the surfaces were conducted with an atomic force microscope (NanoScale Hybrid Microscope, Keyence, tapping mode). The film thickness of the PVA films were 1043 nm (1000 rpm), 782 nm (2000 rpm), 642 nm (3000 rpm) and 533 nm (5000 rpm), respectively, which decreased with the increase in the rotation speed. Moreover, the film thickness of only the poly-D,L-lactic acid nanosheet was about 200 nm. FIG. 6 shows the AFM images where the systems were prepared at 1000, 2000, 3000 and 5000 rpm, respectively, from the left: PS microparticle-fixed PVA films (top row: (a1)-(d1)); films obtained by compositing poly-D,L-lactic acid nanosheets on said PVA films (second row: (a2)-(d2)); and top surfaces (third row: (a3)-(d3)) and back surfaces (fourth row: (a4)-(d4)) of porous poly-D,L-lactic acid nanosheets following removal of PVA films and PS microparticles by water treatment. Furthermore, the results are shown in Table 5.

TABLE 5

| Rotation speed | Concentration of microparticles 10-fold dilution of PS microparticles | | | |
|---|---|---|---|---|
| | 1000 rpm | 2000 rpm | 3000 rpm | 5000 rpm |
| Film thickness of textured sacrificial film (nm) | 1043.0 ± 12.4 | 782.0 ± 18.2 | 642.2 ± 22.8 | 533.7 ± 24.3 |
| Film thickness (nm) | 218.1 ± 4.8 | 197.5 ± 10.6 | 215.3 ± 8.7 | 218.9 ± 9.8 |
| Pore diameter (μm) | 0.9 ± 0.4 | 0.9 ± 0.2 | 0.9 ± 0.4 | 0.9 ± 0.3 |
| Pore diameter distribution value | 44.4% | 22.2% | 44.4% | 33.3% |
| Pore density (×$10^{-3}$/μm$^2$) | 82.5 | 55.3 | 51.0 | 47.5 |

Therefore, since these PS microparticles have a diameter of 900 nm, their ends are exposed to a more extent for thinner film thickness, and the pores were confirmed to be widened in the poly-D,L-lactic acid nanosheet according to that exposure. Specifically, exposure of the PS microparticles was small at the rotation speed of 1000 nm with small pores opened at the rear surface of the poly-D,L-lactic acid nanosheet while only few penetrated through the top surface. At the rotation speed of 2000 rpm or higher, since the total film thickness of the PVA film and the poly-D,L-lactic acid nanosheet is less than the size of the PS microparticles, the PS microparticles are exposed enough to penetrate through the poly-D,L-lactic acid nanosheet, where both the top and the rear surfaces had similar pores, namely penetrating pores, formed.

Thus, a water-soluble concave-convex film with fixed microparticles was used as molds. A nanosheet was built on this film and the water-soluble concave-convex film was dissolved and removed in water to also remove the PS microparticles as well, thereby obtaining a porous ultra-thin film.

Example 4: Method Using Precipitated Microparticles as Molds

The poly-D,L-lactic acid was dissolved in ethyl acetate and adjusted to have a final concentration of 30 mg/mL. Separately, another lithium bromide microparticles were added and dissolved in ethyl acetate to have a final concentration of 60 mg/mL to prepare a solution. These two solutions (10 mg/mL) were mixed at a proportion of poly-D,L-lactic acid: lithium bromide ratio=5:1, 5:2, 5:3, 5:4 or 5:5 (w/w). PVA (Mw: 22 kD, 1 wt %) was formed on a silicon substrate as a sacrificial film and then each of the solutions was spin-coated (3000 rpm, 60 seconds). The dissolved lithium bromide precipitates as ethyl acetate evaporates by spin coating, thereby obtaining a nanosheet containing microcrystals. This was immersed in pure water to dissolve the lithium bromide to peel off the porous ultra-thin film from the silicon substrate. The resultant was picked up and placed onto a silicon substrate for AFM observation. The parts where the precipitated lithium bromide dissolved remained and were observed as the pores. The results are summarized in FIG. 7 and Table 6.

Figure 7:
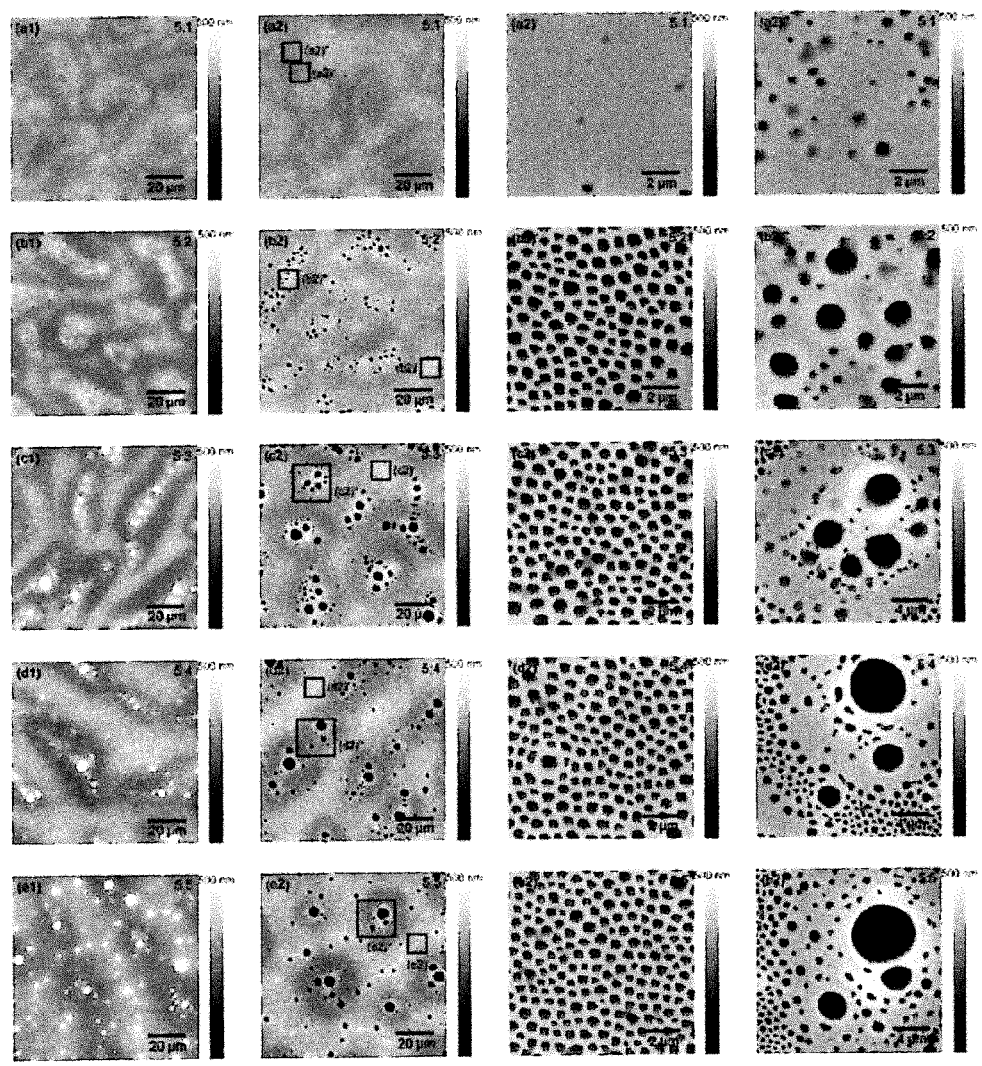
FIG. 7 AFM images of D,L-PLA porous nanosheets obtained by a method that uses microparticles (precipitation/crystallization technique). D,L-PLA:LiBr (w/w) in 5:1 (top row), D,L-PLA:LiBr (w/w) in 5:2 (second row), D,L-PLA:LiBr (w/w) in 5:3 (third row), D,L-PLA:LiBr (w/w) in 5:4 (fourth row) and D,L-PLA:LiBr (w/w) in 5:5 (fifth row). Images after the film formation (left column), the top surfaces after treating them through immersion in water (second column), and enlarged regions shown as AFM images in the third and fourth columns. Each of the rotation speeds (rpm) was 3000.

FIG. 7 shows pictures whose poly-D,L-lactic acid: lithium bromide ratios are 10:1, 10:2, 10:3, 10:4 and 10:5 (v/v), respectively, from the top row: (a1)-(e1) in the left column are pictures before the removal of lithium bromide, (a2)-(e2) in the second column are pictures where lithium bromide was removed in water, (a2)'-(e2)' in the third column are pictures having the smaller porous regions enlarged ten times, and (a2)"-(e2)" in the fourth column are pictures having the larger porous regions enlarged ten times. With the increase in the mixture ratio of lithium bromide, the size distribution of the pores tended to became wider while the number of the pores tended to increase.

TABLE 6

| Rotation speed | Inorganic salt concentration | | | | |
|---|---|---|---|---|---|
| | 10:1 v/v | 10:2 v/v | 10:3 v/v 3000 rpm | 10:4 v/v | 10:5 v/v |
| Film thickness (nm) | 283.0 ± 23.3 | 275.8 ± 46.9 | 262.8 ± 28.7 | 282.2 ± 76.3 | 271.8 ± 98.2 |
| Pore diameter (μm) | 0.50 ± 0.22 | 0.59 ± 0.44 | 0.51 ± 0.61 | 0.60 ± 0.52 | 0.59 ± 0.63 |
| Pore diameter distribution value | 44.0% | 74.6% | 119.6% | 86.7% | 106.8% |
| Pore density (/μm$^2$) | 0.37 | 1.53 | 1.77 | 1.84 | 2.04 |

Example 5: Ratio of Pore Diameter with Respect to Film Thickness

With respect to the porous nanosheets obtained in the above-described examples, the ratios (aspects) of the pore diameters to the film thicknesses were determined as follows.

$$\text{aspect} = \frac{\text{pore diameter (nm)}}{\text{film thickness (nm)}} \quad \text{Formula 1}$$

The ranges of the aspects of the porous nanosheets obtained in the examples are shown below.

TABLE 7

| Production method | Aspect range |
| --- | --- |
| Example 1-1: Method using two types of polymers (PS & PMMA) | 0.787-3.218 |
| Example 1-2: Method using two types of polymers (PS & D,L-PLA) | 3.255-12.976 |
| Example 2: Method using two types of solvents | 1.090-9.771 |
| Example 3: Method using microparticles as molds for textured polymer film | ca. 5.235 |
| Example 4: Method using microparticles as molds (precipitation/crystallization) | 0.990-4.489 |

Example 6: Method Using Two Types of Polymers (2)

2.0% by weight of polyvinyl alcohol (PVA) (Kanto Chemical) was dissolved in water. The resulting PVA solution was applied onto one side of a polyethylene terephthalate (PET) substrate film by gravure printing such that the film thickness after drying becomes about 60 nm. The PVA solution was dried in a hot-air drier at 80° C. for 10 seconds to produce a laminated film which contains the PVA layer on the substrate film.

Furthermore, poly-D/L-lactic acid (PDLLA) (PURSORB PDL20) and polystyrene (PS) (Chemco Co., Ltd.) were dissolved in ethyl acetate at 2.0% by weight of the total amount of the polymer and at a PDLLA: PS ratio of 1:9, 2:8 or 3:7 (w/w). The resulting PDLLA/PS solution was applied onto the above-described PVA layer by gravure printing such that the film thickness after drying becomes 190 nm. The PDLLA/PS solution was dried in a hot-air drier at 50° C. for 10 seconds to produce a laminated film which contains the PDLLA/PS nanosheet on the PVA layer. Table 8 and FIG. 9 summarize the characteristics of the three types of systems having different mixture ratios.

TABLE 8

| PDLLA:PS ratio | Diameter of island parts (μm) | Thickness of island parts (nm) | Thickness of sea parts (nm) | Ratio of island parts (%) |
| --- | --- | --- | --- | --- |
| 1:9 | 2.3 | 43.9 | 132.0 | 14.2 |
| 2:8 | 8.4 | 51.8 | 168.0 | 37.0 |
| 3:7 | 19.7 | 100.0 | 322.2 | 53.1 |

Figure 9:
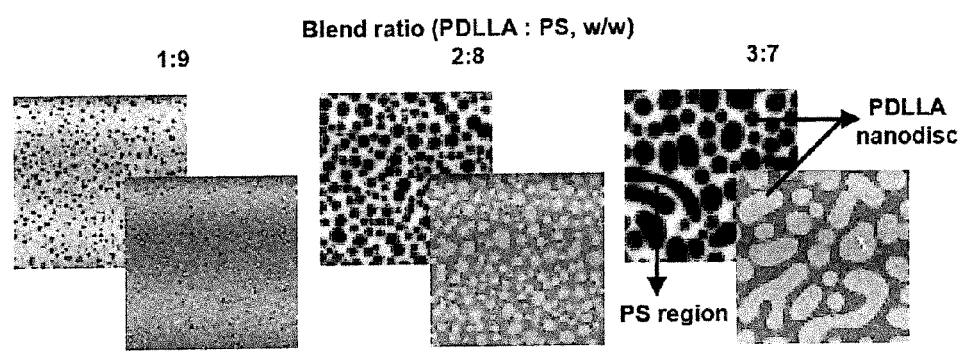
FIG. 9 AFM images of PDLLA/PS nanosheets and porous PS nanosheets. AFM images have PDLLA:PS ratios=1:9, 2:8 and 3:7 (w/w), respectively, from the left.

FIG. 9 shows AFM images where their PDLLA: PS ratios are 1:9, 2:8 and 3:7 (w/w), respectively, from the left. While the shapes of the island parts were disk-like at the PDLLA: PS ratios of 1:9 and 2:8 (w/w), ribbon shapes were obtained at the PDLLA: PS ratio of 3:7 (w/w).

When the laminated film obtained at the PDLLA: PS ratio of 2:8 was immersed together with the substrate film in ion-exchange water, the PVA sacrificial film dissolved and the free-standing PDLLA/PS nanosheet began to peel off. The sheet was manipulated with tweezers to be picked up and placed onto a silicon substrate with either the top or the back surface facing up. Ethyl acetate is a good solvent for PDLLA but a poor solvent for PS. When the PDLLA-PS nanosheet on the silicon substrate is immersed together with the substrate film in ethyl acetate, only the PDLLA regions were selectively removed. Hence, a porous PS nanosheet was obtained. The PDLLA/PS nanosheets and the porous PS nanosheets were observed with an AFM.

Figure 10:
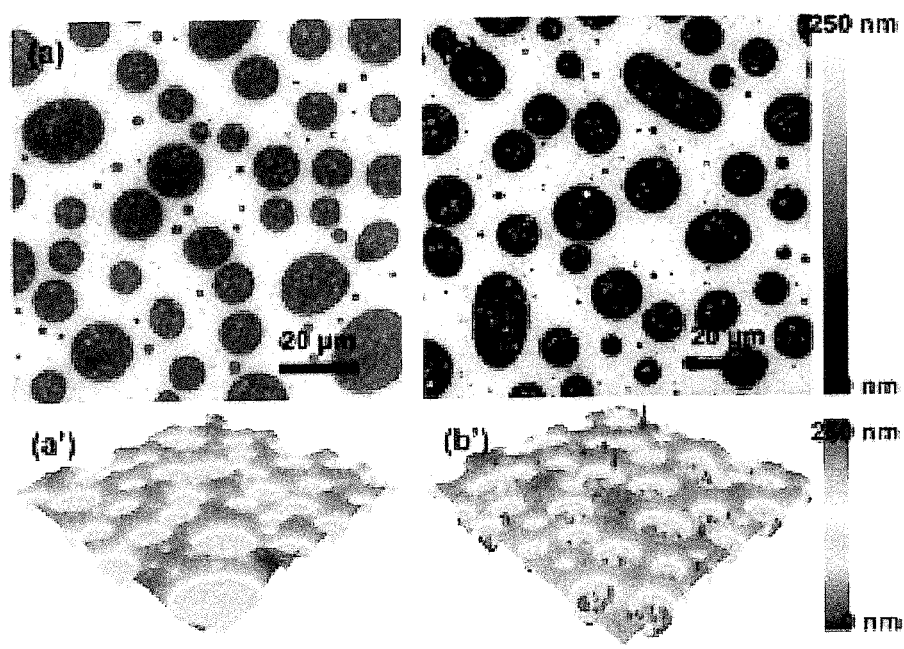
FIG. 10 AFM images of PDLLA/PS nanosheets and porous PS nanosheets. (a) an AFM image of a PDLLA/PS nanosheet, (a') a 3D AFM image of a PDLLA/PS nanosheet, (b) an AFM image of a porous PS nanosheet, and (b') a 3D AFM image of a porous PS nanosheet.

Typical AFM images of the resulting PDLLA/PS nanosheets and porous PS nanosheets are shown in FIG. 10. In FIG. 10, (a) and (b) in the top row are the AFM images of the PDLLA/PS nanosheets. The bright regions represent the phase-separated PS regions. In FIG. 10, (b1) and (b2) in the bottom row are the AFM images of the surfaces of the porous PS nanosheets where the PDLLA regions have been dissolved with ethyl acetate to leave the PS regions.

Figure 11:
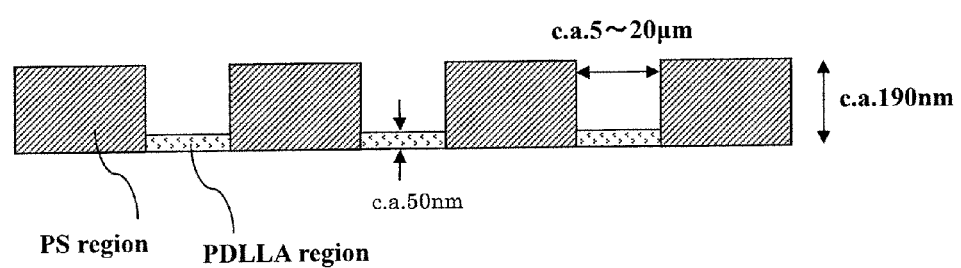
FIG. 11 A schematic view of a porous PS nanosheet.

FIG. 11 is a schematic view of the porous PS nanosheets shown in FIGS. 10(a') and 10(b').

The resulting porous PS nanosheets had a film thickness of 190 nm, with an average pore size of 10 μm (about 5 μm to about 20 μm, pore diameter distribution value: ±60%) at a density of $6 \times 10^{-3}$ pores/μm$^2$.

The aspect range of the porous PS nanosheets determined according to the method described in Example 5 was about 10-100.

Now, cyclohexane is a poor solvent for PDLLA but a good solvent for PS. The PDLLA-PS nanosheet obtained on the PET substrate at the PDLLA: PS ratio of 2:8 was immersed together with the substrate film in cyclohexane, PS was washed, and the resultant was further infiltrated in ion-exchange water, thereby obtaining an aqueous solution having a free-standing PDLLA nanodisc mixed. The resultant was subjected to centrifugation and the resulting concentrated liquid was dropped onto a silicon substrate, dried and observed with an AFM.

Typical AFM images of the resulting PDLLA nanodiscs are shown in FIG. 12. All of FIGS. 12(a), 12(b) and 12(c) are the AFM images of PDLLA nanodiscs provided on the same silicon substrate.

FIGS. 12(a) and 12(c) show the AFM images of PDLLA nanodiscs having monolayer structures on a silicon substrate, while FIG. 12(b) shows the AFM image of a PDLLA nanodisc having a bilayer structure.

The resulting PDLLA nanodiscs had a film thickness of 59 nm and an average diameter of 8 μm (3-12 μm).

Accordingly, two types of polymers that are mutually immiscible in solid states are dissolved in a common solvent, which is casted to obtain a blend nanosheet that has been phase-separated into a sea-island structure, which, in turn, is treated with a good solvent for the polymer making up the island parts to obtain a porous nanosheet. Moreover, treatment with a good solvent for a polymer making up the sea parts can give a nanodisc.

The invention claimed is:

1. A substantially disk-shaped ultra-thin polymer film whose film thickness is 10 nm-1000 nm and whose size is in a range of 30 nm-50 μm, wherein the polymer is a single polymer selected from the group consisting of polymethyl methacrylate, poly-D/L-lactic acid, polyethylene glycol and polyvinylpyrrolidone.

2. The substantially disk-shaped ultra-thin polymer film according to claim 1, wherein the size is in a range greater than 1 μm and less than or equal to 25 μm.

3. The substantially disk-shaped ultra-thin polymer film according to claim 2, wherein the size is in a range greater than 1 μm and less than or equal to 15 μm.

4. The substantially disk-shaped ultra-thin polymer film according to claim 1, wherein the polymer is poly-D/L-lactic acid.

* * * * *